US008716360B2

United States Patent
Mitsuoka et al.

(10) Patent No.: US 8,716,360 B2
(45) Date of Patent: May 6, 2014

(54) CURING-TYPE COATING-AGENT COMPOSITION

(75) Inventors: Tetsuya Mitsuoka, Kariya (JP); Toshihisa Shimo, Kariya (JP); Kyoko Kumagai, Kariya (JP); Hidetaka Hayashi, Kariya (JP); Hiroaki Takashima, Kariya (JP); Naoharu Ueda, Kariya (JP); Kazumasa Inata, Nagoya (JP); Takeshi Fujita, Nagoya (JP); Yasuyuki Sanai, Nagoya (JP); Eiichi Okazaki, Nagoya (JP); Satoshi Yoneda, Nagoya (JP)

(73) Assignees: Kabushiki Kaisha Toyota Jidoshokki, Aichi (JP); Toagosei Co., Ltd., Tokyo (JP)

(*) Notice: Subject to any disclaimer, the term of this patent is extended or adjusted under 35 U.S.C. 154(b) by 0 days.

(21) Appl. No.: 13/697,174

(22) PCT Filed: May 24, 2011

(86) PCT No.: PCT/JP2011/002878
§ 371 (c)(1),
(2), (4) Date: Nov. 9, 2012

(87) PCT Pub. No.: WO2011/155139
PCT Pub. Date: Dec. 15, 2011

(65) Prior Publication Data
US 2013/0065982 A1    Mar. 14, 2013

(30) Foreign Application Priority Data

Jun. 11, 2010 (JP) ................................. 2010-134113

(51) Int. Cl.
*C08G 18/67* (2006.01)
*C08F 2/46* (2006.01)
*C08J 3/28* (2006.01)
*C08G 61/04* (2006.01)

(52) U.S. Cl.
USPC ...................... 522/90; 522/1; 522/113; 520/1

(58) Field of Classification Search
USPC ...................... 522/90, 1, 113; 520/1
See application file for complete search history.

(56) References Cited

U.S. PATENT DOCUMENTS

| 6,306,502 B1 * | 10/2001 | Fukushima et al. | 428/412 |
| 2004/0013976 A1 | 1/2004 | Fujimoto et al. | |
| 2006/0166140 A1 | 7/2006 | Fujimoto et al. | |
| 2006/0167200 A1 * | 7/2006 | Fujimoto et al. | 526/329.7 |
| 2011/0319582 A1 * | 12/2011 | Inata et al. | 526/262 |

FOREIGN PATENT DOCUMENTS

| JP | 10-287824 A | 10/1998 |
| JP | 2000-63701 A | 2/2000 |
| JP | 2001-214122 A | 8/2001 |
| JP | 2002-69382 A | 3/2002 |
| JP | 2002-245672 A | 8/2002 |
| JP | 2003-213159 A | 7/2003 |
| JP | 3747065 B2 | 2/2006 |
| JP | 2009-227802 A | 10/2009 |
| JP | 2011-144307 A | 7/2011 |
| WO | 97/11129 A1 | 3/1997 |
| WO | WO 2010/067876 * | 6/2010 |
| WO | 2011/048775 A1 | 4/2011 |
| WO | 2011/048776 A1 | 4/2011 |

OTHER PUBLICATIONS

International Search Report for PCT/JP2011/002878 dated Aug. 16, 2011.

* cited by examiner

*Primary Examiner* — Ling Choi
*Assistant Examiner* — Jessica E Whiteley
(74) *Attorney, Agent, or Firm* — Sughrue Mion, PLLC

(57) ABSTRACT

A curing-type coating-agent composition according to the present invention contains: Component (A) including a urethane adduct compound exhibiting weatherability in an amount of from 99 to 65 parts by mass; Component (B) comprising a reaction product between a colloidal silica and an alkoxysilane compound having a maleimide group in an amount of from 1 to 35 parts by mass; a radical-polymerization initiator serving as Component (C) in an amount of from 0.1 to 10 parts by mass; an ultraviolet absorber serving as Component (D) in an amount of from 1 to 12 parts by mass; and an organic solvent serving as Component (E) in an amount of from 10 to 1,000 parts by mass; with respect to a sum of Component (A) and Component (B) being taken as 100 parts by mass.

The composition according to the present invention demonstrates excellent wear resistance and weatherability as a coating agent for plastic substrate, or the like, which is employed outside.

11 Claims, No Drawings

CURING-TYPE COATING-AGENT COMPOSITION

CROSS REFERENCE TO RELATED APPLICATIONS

This application is a National Stage of International Application No. PCT/JP2011/002878 filed May 24, 2011, claiming priority based on Japanese Patent Application No. 2010-134113 filed Jun. 11, 2010, the contents of all of which are incorporated herein by reference in their entirety.

TECHNICAL FIELD

The present invention relates to a curing-type coating-agent composition, which is excellent in terms of post-curing wear resistance and weatherability and which can be applied preferably as protective films for substrates being employed outside, in particular, for substrates being made of resins.

BACKGROUND ART

Resinous materials, among them, transparent resinous materials, which are represented by polycarbonate or the like, have been utilized widely in various applications while taking advantages of such characteristics as being low specific gravity as well as lightweight, being processed easily, and being strong against shocks compared with inorganic glass. On the contrary, resinous materials have the following disadvantages: their surface is likely to be damaged so that the gloss or transparency is likely to be lost; they are likely to be damaged by organic solvents; or moreover, they are poor in the weatherability (e.g., the photo stability against ultraviolet rays, etc.) and heat resistance; and the like. Consequently, it is often the case that resinous materials are used while being covered with various protective films in order to improve their superficial characteristics.

As such a protective film being good in the wear resistance and weatherability, a hard coating layer is given which is made by curing a photo curing-type coating-agent composition, for instance.

For resinous materials being employed outside, good weatherability is also required along with wear resistance. As a light curing-type coating-agent composition being provided with both wear resistance and weatherability combinedly, a composition for forming wear-resistant coating has been known (see Patent Literature No. 1). The composition includes a monomer mixture, and a photo-polymerization initiator in a specific proportion, respectively. The monomer mixture comprises: colloidal silica fine particles, in which a silane compound having a methacryloyloxy group, an acryloyloxy group or a vinyl group is modified superficially in a predetermined weight proportion; a poly[(meth)acryloyloxy-alkyl]isocyanurate; and a urethane(poly)methacrylate, which has an alicyclic framework.

Moreover, another coating-agent composition has also been known (see Patent Literature No. 2). The coating-agent composition includes the following in a specific proportion, respectively: a poly(meth)acrylate of mono- or poly-pentaerythritol; a urethane poly(meth)acrylate, which has at least two radically-polymerizable unsaturated double bonds; a poly[(meth)acryloyloxyalkyl](iso)cyanurate, an ultraviolet absorber; a hindered amine-based light stabilizer; and a photo-polymerization initiator.

An example is also available in which a thermal curing-type coating-agent composition is used. Patent Literature No. 3 discloses a plastic article. In the plastic article, a first layer, which is made by curing a thermo-curing undercoating-agent composition being good in the weatherability, is disposed on a surface of a resinous substrate; and a second layer, which is made by curing a thermo-curing coating-agent composition being good in the wear resistance, is disposed on the first layer.

RELATED TECHNICAL LITERATURE

Patent Literature

Patent Literature No. 1: Japanese Patent Gazette No. 3747065;
Patent Literature No. 2: Japanese Unexamined Patent Publication (KOKAI) Gazette No. 2000-063701; and
Patent Literature No. 3: Japanese Unexamined Patent Publication (KOKAI) Gazette No. 2001-214122

SUMMARY OF THE INVENTION

Assignment to be Solved by the Invention

In the plastic article being set forth in Patent Literature No. 3, the wear resistance, and the weatherability are made compatible with each other at higher level. However, thermal curing-type compositions have the following problems: they require a large amount of energy in order to form cured films, compared with photo curing-type compositions; and they are poor in terms of efficiency, because longer times are needed to heat them; and the like. Moreover, they are not desirable from the viewpoint of productivity, because the number of processing steps increases when not only a coating-agent composition but also an undercoating-agent composition are employed as done in Patent Literature No. 3. Hence, a coating-agent composition, which makes it possible to form protective films that demonstrate wear resistance and weatherability sufficiently without using any undercoating-agent composition, has been desired eagerly.

Using a photo curing-type composition makes production with good efficiency feasible. Although the above-mentioned urethane(poly)methacrylate having an alicyclic framework is a component that improves the weatherability of hard coating layer, it is insufficient with regard to the wear resistance. In the respective examples according to Patent Literature No. 1, colloidal silica particles (or ultraviolet-curing silicone), which are modified superficially with a silane compound having a methacryloyloxy group, are employed along with this urethane (poly)methacrylate. However, the resulting wear resistance cannot be said to be sufficient, and moreover it is unclear with regard to the weatherability after 2,000 hours or later.

On the other hand, a hard coating layer, which is made by curing the above-mentioned poly(meth)acrylate of mono- or poly-pentaerythritol, exhibits a high hardness. Hence, in Patent Literature No. 2, this component is used in combination with a urethane poly(meth)acrylate having at least two radically-polymerizable unsaturated double bonds, namely, a component that upgrades weatherability. However, as a result of investigations done by the present inventors, it was understood that it is not possible to withstand accelerated tests for much longer periods of time by simply using a component for upgrading wear resistance in combination with another component for upgrading weatherability.

In other words, even when a hard coating layer is formed on a surface of a resinous substrate with use of the above-mentioned photo curing-type coating-agent composition, it is difficult to make the resulting wear resistance and weatherability compatible with each other at higher level.

In view of these problematic issues, the present invention aims at providing a curing-type coating-agent composition, which demonstrates excellent wear resistance and weatherability as a coating agent for substrate being employed outside, in particular, for substrate being made of resin.

Means for Solving the Assignment

As a result of the present inventors' earnest investigations, they found out that a composition, in which the following are used combinedly in a specific proportion respectively: a urethane adduct being excellent in terms of weatherability; and a reaction product between a colloidal silica and an alkokysilane compound having a maleimide group, and additionally to which additives are added in an appropriate amount respectively, is excellent in terms of post-curing transparency and wear resistance, and demonstrates the excellent weatherability that the urethane adduct compound has. Thus, they arrived at completing the present invention.

Specifically, a curing-type coating-agent composition according to the present invention is characterized in that it contains:

following Component (A) in an amount of from 99 to 65 parts by mass;

following Component (B) in an amount of from 1 to 35 parts by mass;

a radical-polymerization initiator serving as Component (C) in an amount of from 0.1 to 10 parts by mass;

an ultraviolet absorber serving as Component (D) in an amount of from 1 to 12 parts by mass; and an organic solvent serving as Component (E) in an amount of from 10 to 1,000 parts by mass;

with respect to a sum of said Component (A) and said Component (B) being taken as 100 parts by mass.

Component (A): a mixture of isocyanuric ring-containing (meth)acrylates, the mixture being constituted of a urethane adduct compound (a1) and a tri(meth)acrylate compound (a2);

the urethane adduct compound (a1) being obtainable by an addition reaction of a hydroxide group-containing di(meth)acrylate compound, which is expressed by following General Formula (1), and an isocyanate compound, which has two or more isocyanate groups within the molecule;

the tri(meth)acrylate compound (a2) being expressed by following General Formula (2);

(Chemical Formula 1)

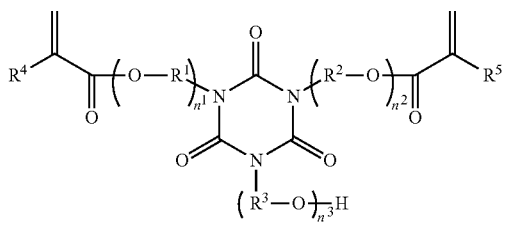

(1)

(In General Formula (1), each of $R^1$, $R^2$ and $R^3$ expresses a divalent organic group whose number of carbon atoms is from 2 to 10 independently; each of $R^4$ and $R^5$ expresses a hydrogen atom or a methyl group independently; each of $n^1$, $n^2$ and $n^3$ expresses a number of from 1 to 3 independently; and $n^1+n^2+n^3=$from 3 to 9);

(Chemical Formula 2)

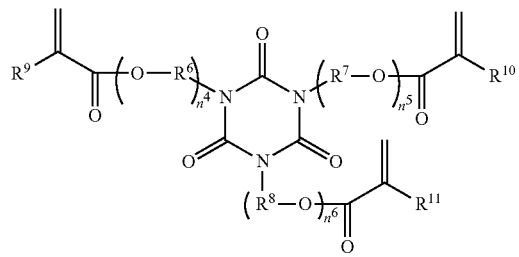

(2)

(In General Formula (2), each of $R^6$, $R^7$ and $R^8$ expresses a divalent organic group whose number of carbon atoms is from 2 to 10 independently; each of $R^9$, $R^{10}$ and $R^{11}$ expresses a hydrogen atom or a methyl group independently; each of $n^4$, $n^5$ and $n^6$ expresses a number of from 1 to 3 independently; and $n^4+n^5+n^6=$from 3 to 9);

Component (B): an involatile component in reaction products being made by reacting an alkoxysilane compound (b1), which is expressed by following General Formula (3), with a colloidal silica (b2), in a mass ratio of from 9:1 to 1:9 between (b1) and (b2), the involatile component involving those in which (b2) is modified chemically with (b1);

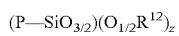

(3)

(In General Formula (3), "P" expresses a group being expressed by following General Formula (4); $R^{12}$ expresses a hydrogen atom or a monovalent organic group; and "z" expresses a positive number of from 0.1 or more to 3 or less; moreover, when "z" is less than 3, (b1) involves a condensate, and each of "P" and $R^{12}$ may even involve two or more types of distinct groups within a molecule in the condensate);

(Chemical Formula 3)

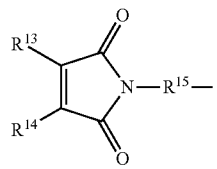

(4)

(In General Formula (4), each of $R^{13}$ and $R^{14}$ expresses a hydrogen atom, an alkyl group, an alkenyl group or an aryl group independently, or alternatively expresses a hydrocarbon group in which $R^{13}$ and $R^{14}$ are unified to form a five-membered ring or a six-membered ring; and $R^{15}$ expresses a divalent saturated hydrocarbon group whose number of carbon atoms is from 1 to 6.)

By means of the curing-type coating-agent composition according to the present invention, it becomes feasible to manufacture cured films that are excellent in terms of transparency, wear resistance and weatherability, because it is made by using, in addition to Component (A) exhibiting excellent weatherability, Component (B), a novel inorganic additive, and additionally blending each of aforementioned Components (A) through (E) in a specific proportion. Members having such cured films on the surface are combinedly provided not only with wear resistance, but also with weatherability as well that is sufficient for their outdoor employment.

Moreover, although the composition according to the present invention includes Component (B) serving as an inorganic additive, its blending proportion is a small amount relatively. Hence, even when substrates to which the composition according to the present invention is applied are made of resin, it is believed that the resulting cured films exhibit excellent adhesiveness with respect to a surface of the substrates being made of resin.

It is also advisable to employ the composition according to the present invention as a light curing-type coating-agent composition that is cured by irradiating it with light. By means of curing the composition by irradiating it with light, it becomes feasible to cure it with lower energy in a shorter period of time. Moreover, by specifying a blending proportion of the ultraviolet absorber and furthermore a type of the ultraviolet absorber, the curing progresses satisfactorily even when curing the composition by irradiating it with light. Thus, cured films are obtainable which are excellent in terms of transparency, and in which the wear resistance and weatherability are made compatible with each other.

Effect of the Invention

The curing-type coating-agent composition according to the present invention demonstrates excellent wear resistance and weatherability as a coating agent for substrate being employed outside, in particular, for substrate being made of resin.

MODES FOR CARRYING OUT THE INVENTION

Hereinafter, explanations will be made on some of the best modes for performing the curing-type coating-agent composition according to the present invention. Note that, unless otherwise specified, ranges of numeric values, "from 'p' to 'q'" being set forth in the present description, involve the lower limit, "p," and the upper limit, "q," in those ranges. And, the other ranges of numeric values are composable by arbitrarily combining values that involve not only those upper-limit values and lower-limit values but also numerical values that are enumerated in the following examples.

A curing-type coating-agent composition according to the present invention contains: Component (A) in an amount of from 99 to 65 parts by mass; Component (B) in an amount of from 1 to 35 parts by mass; a radical-polymerization initiator serving as Component (C) in an amount of from 0.1 to 10 parts by mass; an ultraviolet absorber serving as Component (D) in an amount of from 1 to 12 parts by mass; and an organic solvent serving as Component (E) in an amount of from 10 to 1,000 parts by mass; with respect to a sum of following Component (A) and following Component (B) being taken as 100 parts by mass. Hereinafter, explanations will be made on details of the composition and its respective components.

Note that, in the present description, an acryloyl group or a methacryloyl group is expressed as a "(meth)acryloyl group." Moreover, acrylate or methacrylate is expressed as "(meth)acrylate."

Component (A)

Component (A) is a mixture of isocyanuric ring-containing (meth)acrylates that is constituted of a urethane adduct compound (a1) (hereinafter being referred to as "Component (a1)") and a tri(meth)acrylate compound (a2) (hereinafter being referred to as "Component (a2)").

Component (a1) is obtainable by an addition reaction of a hydroxyl group-containing di(meth)acrylate compound, which is expressed by following General Formula (1), and an isocyanate compound, which has two or more isocyanate groups within the molecule.

Hereinafter, the aforementioned hydroxyl group-containing di(meth)acrylate compound will be abbreviated to as a "di(meth)acrylate (1)," and the aforementioned isocyanate compound will be abbreviated to as a "polyisocyanate."

(Chemical Formula 4)

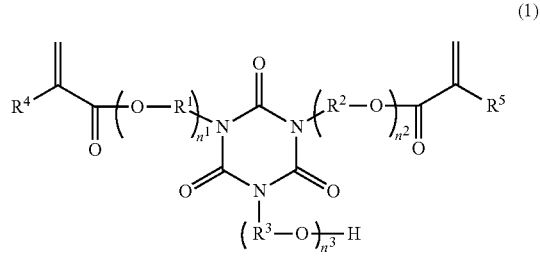

(1)

In General Formula (1) that expresses the di(meth)acrylate (1), each of $R^1$, $R^2$ and $R^3$ expresses a divalent organic group whose number of carbon atoms is from 2 to 10 independently.

As for a divalent organic group whose number of carbon atoms is from 2 to 10, an alkylene group whose number of carbon atoms is from 2 to 4, such as an ethylene group, a trimethylene group, a propylene group or a tetramethylene group, is preferable. Moreover, compounds, in which the compounds according to General Formula (1) that have one of these groups have been modified with ε-caprolactone, are also involved. In this case, the divalent organic group whose number of carbon atoms is from 2 to 10 involves —$COCH_2CH_2CH_2CH_2CH_2$—.

Of these, it is especially preferable that all of $R^1$, $R^2$ and $R^3$ can be an ethylene group, respectively, because post-curing compositions (or cured films), which are excellent in terms of wear resistance and weatherability, are obtainable.

In General Formula (1), each of $R^4$ and $R^5$ expresses a hydrogen atom or a methyl group independently. Compounds, in which both of $R^4$ and $R^5$ can respectively be a hydrogen atom, are especially preferable, from the viewpoint that the resulting compositions turn into ones which are excellent in terms of curability.

Each of $n^1$, $n^2$ and $n^3$ expresses a number of from 1 to 3 independently. However, $n^1+n^2+n^3$=from 3 to 9. As for $n^1$, $n^2$ and $n^3$, they can preferably be 1, respectively. As for $n^1+n^2+n^3$, it can preferably be 3.

The di(meth)acrylate (1) can preferably be produced by reacting an alkylene oxide adduct of isocyanuric acid with a (meth)acrylic acid. Note that $n^1+n^2+n^3$ herein expresses an average added molar number of alkylene oxide per one molecule of the di(meth)acrylate (1).

As for the polyisocyanate, various compounds are employable.

From the viewpoint of weatherability of the resulting cured film, the polyisocyanate can preferably be a compound that does not include any aromatic ring.

As for a preferable example of the polyisocyanate, the following can be given: isophorone diisocyanate; hexamethylene diisocyanate; 4,4'-dicyclohexylmethane diisocyanate; norbornane diisocyanate; and isocyanurate-type trimers of these.

Of these, isophorone diisocyanate can be an especially preferable option, because it is excellent particularly in terms of weatherability.

Component (a1) can be synthesized by means of addition reaction between said di(meth)acrylate (1) and polyisocyanate. Although it is feasible to do this addition reaction without any catalyst, it is also advisable to add a tin-based catalyst, such as dibutyltin dilaurate, or an amine-based catalyst, such as triethylamine, in order to make the reaction progress effectively.

Component (a2) is expressed by following General Formula (2).

(Chemical Formula 5)

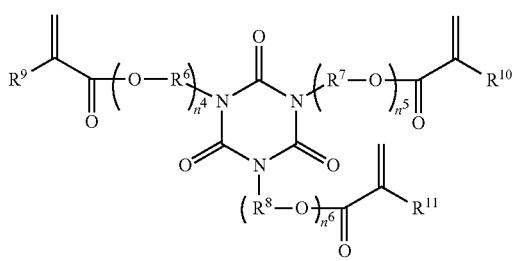

(2)

In General Formula (2) that expresses Component (a2), each of $R^6$, $R^7$ and $R^8$ expresses a divalent organic group whose number of carbon atoms is from 2 to 10 independently.

As for a divalent organic group whose number of carbon atoms is from 2 to 10, an alkylene group whose number of carbon atoms is from 2 to 4, such as an ethylene group, a trimethylene group, a propylene group or a tetramethylene group, is preferable. Moreover, compounds, in which the compounds according to General Formula (2) that have one of these groups have been modified with ε-caprolactone, are also involved. In this case, the divalent organic group whose number of carbon atoms is from 2 to 10 involves —$COCH_2CH_2CH_2CH_2CH_2$—.

Of these, it is especially preferable that all of $R^6$, $R^7$ and $R^8$ can be an ethylene group, respectively, because cured films, which are excellent in terms of wear resistance and weatherability, are obtainable.

In General Formula (2), each of $R^9$, $R^{18}$ and $R^{11}$ expresses a hydrogen atom or a methyl group independently. Compounds, in which all of these can respectively be a hydrogen atom, are especially preferable, from the viewpoint that the resulting compositions turn into ones which are excellent in terms of curability.

Each of $n^4$, $n^5$ and $n^6$ expresses a number of from 1 to 3 independently. However, $n^4+n^5+n^6$=from 3 to 9. As for $n^4$, $n^5$ and $n^6$, they can preferably be 1, respectively. As for $n^4+n^5+n^6$, it can preferably be 3.

Component (a2) can preferably be produced by reacting an alkylene oxide adduct of isocyanuric acid with a (meth) acrylic acid. Note that $n^4+n^5+n^6$ herein expresses an average added molar number of alkylene oxide per one molecule of Component (a2).

Component (A) according to the present invention is a mixture of Component (a1) and Component (a2).

It is advisable that a proportion between Component (a1) and Component (a2) can be set up appropriately depending on objectives. However, a mixture, which includes them in such amass ratio as (a1):(a2)=from 1:9 to 7:3, is preferable. Note that a compound, which includes them in such a mass ratio as (a1):(a2)=from 2:8 to 6:4, or furthermore from 2:8 to 4:6, is more preferable.

By setting a mass ratio between (a1) and (a2) in these ranges, it is possible to obtain the cured film which is excellent in terms of wear resistance as well as weatherability.

A content proportion of Component (A) in the composition according to the present invention can be from 99 to 65 parts by mass, more preferably from 98 to 85 parts by mass, with respect to a sum of Component (A) and Component (B) being taken as 100 parts by mass.

By setting a content proportion of Component (A) at from 99 to 65 parts by mass, it is possible to obtain cured films which are excellent in terms of wear resistant as well as weatherability.

Component (B)

Component (B) according to the present invention is an involatile component in reaction products that are made by reacting an alkoxysilane compound (b1), which is expressed by following General Formula (3), with a colloidal silica (b2), in amass ratio of from 9:1 to 1:9 between (b1) and (b2), and is one which involves those in which (b2) is modified chemically with (b1).

Note that, although the generation of Component (B) is usually carried out in a solvent, Component (B) can be components from which water and the organic solvent that have been employed in the reaction are excluded. Moreover, Component (B) can be components from which alcohols that alkoxysilanes are hydrolyzed to generate, and water that is generated by the condensation of silanols, are excluded. That is, Component (B) means an involatile component within reaction products. To put it differently, it means an Si-containing component.

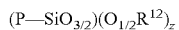

(3)

(In General Formula (3), "P" expresses a group being expressed by following General Formula (4); $R^{12}$ expresses a hydrogen atom or a monovalent organic group; and "z" expresses a positive number of from 0.1 or more to 3 or less; moreover, when "z" is less than 3, (b1) involves a condensate, and each of "P" and $R^{12}$ may even involve two or more types of distinct groups within a molecule in the condensate.)

(Chemical Formula 6)

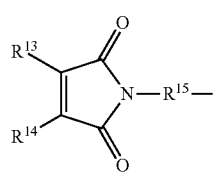

(4)

(In General Formula (4), each of $R^{13}$ and $R^{14}$ expresses a hydrogen atom, an alkyl group, an alkenyl group or an aryl group independently, or alternatively expresses a hydrocarbon group in which $R^{13}$ and $R^{14}$ are unified to form a five-membered ring or a six-membered ring; and $R^{15}$ expresses a divalent saturated hydrocarbon group whose number of carbon atoms is from 1 to 6.)

In General Formula (3), $R^{12}$ expresses a hydrogen atom, or a monovalent organic group.

As for the monovalent organic group for $R^{12}$, the following can be given concretely: an alkyl group whose number of carbon atoms is from 1 to 6; an alkoxyalkyl group whose number of carbon atoms is form 1 to 6; and other organic groups comprising C, H and O atoms whose number of carbon atoms is from 1 to 6.

From the viewpoint of reactivity, $R^{12}$ can preferably be a hydrogen atom, a monovalent organic group whose number of carbon atoms is from 1 to 6 and which may have an oxygen atom, or can more preferably be a hydrogen atom or an alkyl group whose number of carbon atoms is from 1 to 6.

As for the alkyl group for $R^{13}$ and $R^{14}$, an alkyl group whose number of carbon atoms is from 1 to 4 is preferable. As for the alkenyl group, an alkenyl group whose number of carbon atoms is from 2 to 4 is preferable. As for the aryl group, it is possible to name a phenyl group, and the like.

In particular, from the viewpoint that the resulting composition is excellent in terms of curability and cured films resulting from it turn into ones which are good in terms of wear resistance, the following are more preferable: one of $R^{13}$ and $R^{14}$ is a hydrogen atom, and the other one of them is a methyl group; both of them are a methyl group, respectively; or a saturated hydrocarbon group in which they are unified each other to form a five-membered ring or a six-membered ring.

Of these, a preferable option can be the following, because it is good in terms of weatherability: one which makes a saturated hydrocarbon group in which $R^{13}$ and $R^{14}$ are unified to form a six-membered ring, that is, a group, in which the maleimide group in General Formula (4) is expressed by following General Formula (5) (namely, $R^{13}$ and $R^{14}$ are unified to constitute a tetramethylene group).

(Chemical Formula 7)

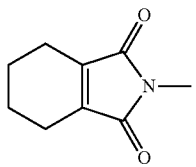

(5)

In General Formula (4), $R^{15}$ expresses a divalent saturated hydrocarbon group whose number of carbon atoms is from 1 to 6, and can also have straight-chain or linear shapes or even have branches. As for a linear saturated hydrocarbon group, it is possible to exemplify an ethylene group, a 1,3-propylene group, a 1,4-buthylene group, a 1,5-pentanediyl group, and a 1,6-hexanediyl group. As for a branched alkylene group, it is possible to exemplify a 1,2-proplylene group, a 1,2-butylene group, a 1,3-buthylene group, a 2,3-butylene group, a 1,3-pentanediyl group, a 2,4-pentanediyl group, a 2,5-hexanediyl group, a 2-methyl-1,3-propylene group, a 2-ethyl-1,3-propylene group, and a 3-methyl-1,5-pentanediyl group.

As for $R^{15}$, a linear divalent saturated hydrocarbon group whose number of carbon atoms is from 3 to 6.

From the viewpoint that cured substances of the composition turn into one which is excellent in terms of wear resistance and weatherability, the following can be an especially suitable option as $R^{15}$: a divalent saturated hydrocarbon group whose number of carbon atoms is from 1 to 6, or furthermore a linear divalent saturated hydrocarbon group whose number of carbon atoms is from 3 to 6.

In General Formula (3), "z" is a positive number, and satisfies 0.1≤"z"≤3. "z" expresses an average number of moles of residual $OR^{12}$ group per one mole of Si atom, or can preferably express an average number of moles of residual alkoxy group. When "z" is 3, (b1) represents P—Si(OR$^{12}$)$_3$ (hereinafter being referred to as a "monomer"). Moreover, when "z" is less than 3, (b1) represents a monomer condensate, or a mixture of a monomer condensate and the monomer. Moreover, this mixture can preferably be a compound in which a compound having an alkoxysilyl group (i.e., in a case where $R^{12}$ is an alkyl group) makes a major component, or may even involve a compound having a silanol group (i.e., in a case where $R^{12}$ is a hydrogen atom).

By setting "z" at 0.1 or more, the colloidal silica is superficially modified sufficiently, and so the resulting cured substances turn into ones which are excellent in terms of scratch resistance. Moreover, from the standpoint of reactivity, "z" can preferably satisfy 0.4≤"z"≤3, or furthermore 0.8≤"z"≤3.

Note that it is possible to find the value of "z" from the integral ratio of hydrogen atom after measuring the $^1$H-NMR spectrum for (b1).

Note that, in a case where (b1) is a condensate, "P" within (P—SiO$_{3/2}$) and $R^{12}$ within (O$_{1/2}R^{12}$) may even have two or more types of distinct chemical structures within one molecule, respectively.

Moreover, it is believed that (b1) would mainly be a mixture of a monomer and oligomers (condensed entities), such as dimers and trimers. Therefore, although a molecular weight of (b1) is low relatively, it is difficult to define the molecular weight as an average molecular weight because of being a mixture.

Explanations will be made on a preferable production process for said compound according to Formula (3). For example, a process comprising the following can be given: turning a carboxylic acid anhydride having a double bond, which is expressed by following General Formula (6), into an amic acid by adding an aminoalkyltrialkoxysilane, which is expressed by following General Formula (7), to the carboxylic acid anhydride; subjecting the resulting amic acid thereafter to ring closing to make a maleimide group by means of heating; and then reacting the alkoxy group subsequently.

This process is especially preferable, from such a viewpoint that, in accordance with the process, it is possible to produce (b1), which is suitable for the curing-type coating-agent composition according to the present invention, by a one-step reaction with use of raw materials, which are readily procurable.

(Chemical Formula 8)

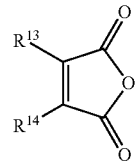

(6)

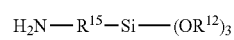

(7)

Note that, in Formula (6) and Formula (7), $R^{12}$ through $R^{15}$ are synonymous with those above-mentioned.

First of all, the amino group of an aminoalkyltrialkoxysilane is added to a carboxylic acid anhydride having a double bond, and thereby an auric acid (hereinafter referred to as "AMA") generates. Next, when heating a solution including the AMA, a ring-closing reaction proceeds, and thereby a maleimide group generates. Since water generates in the ring-closing reaction, a hydrolytic condensation reaction of the alkoxy group proceeds by means of that water.

(Reaction Equation)

(Chemical Formula 9)

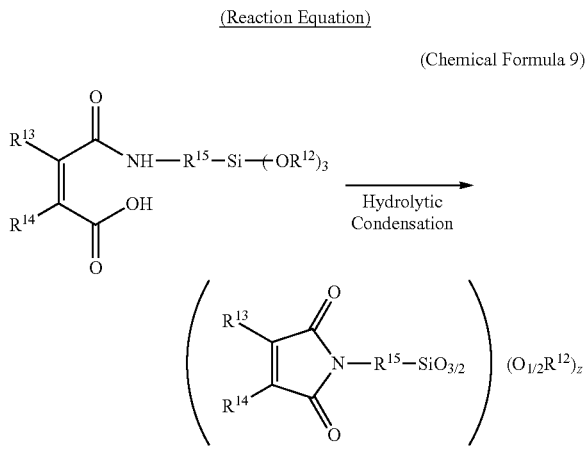

Note herein that, in a case when the ring-closing reaction is complete and the generated water are consumed fully for the hydrolytic condensation reaction of alkoxysilane, "z" becomes 1 theoretically. It is feasible to adjust "z" in Formula (3) in a range of from 1 to 3. As for a method of setting "z" at less than 1, a method of adding water to the reaction system can be given. On the other hand, as for a method of setting "z" at more than 1, the following can be given: a method of removing water from the reaction system; or a method in which a dewatering agent is employed. For example, in a case of causing the reactions under conditions according to later-described examples, (b1) can be generated so that "z" satisfies 1≤"z"≤1.5 approximately.

It is advisable that the aforementioned production process can be carried out in the presence of an organic solvent. As for the organic solvent, organic solvents are preferable which dissolve the AMA and which do not react with the other raw materials. To be concrete, an aromatic compound, such as toluene or xylene, is preferable. However, since the reaction between acid anhydride and amino group is very quick, it is possible to employ a polar solvent, such as alcohol or ester, as well.

As for a temperature of the ring-closing reaction, it can preferably fall in a range of from 70 to 150° C.

In a case where a compound that hardly dissolves water (namely, an aromatic compound, for instance) is employed as the organic solvent, it is preferable to carry out desolvating after completing the reaction.

As for a proportion between the carboxylic acid anhydride having a double bond and the aminoalkyltrialkoxysilane, it can be equimolar to each other. As for the carboxylic acid anhydride having a double bond and as for the aminoalkyltrialkoxysilane, it is also possible to combinedly use a plurality of species for each of them.

In a case where the resulting maleimide group in (b1) is likely to undergo thermal radical polymerization in the aforementioned reaction, it is possible to employ a polymerization inhibitor, or to introduce an oxygen-containing gas, such as air, into the reaction solution, for the purpose of preventing polymerization of the raw materials or maleimide groups in the resultant products.

As for the polymerization inhibitor, the following can be given: hydroquinone, tert-butylhydroquinone, hydroquinone monomethyl ether, 2,6-di-tert-butyl-4-methyl phenol, 2,4,6-tri-tert-butyl phenol, benzoquinone, phenothiazine, N-nitroso phenylhydroxylamine, ammonium salts of N-nitroso phenylhydroxylamine, aluminum salts of N-nitroso phenylhydroxylamine, copper dibutyldithiocarbamate, copper chloride, and copper sulfate, for instance.

On the other hand, in a case where the resulting maleimide group in (b1) is Formula (5), no polymerization inhibitor is needed, and it is possible to produce it in an inert-gas atmosphere, such as nitrogen, because it is less likely to undergo thermal radical polymerization.

Although it is possible to employ various species as for (b2), one in which spherical particles are dispersed uniformly is preferable. For example, one in which they are dispersed uniformly in an alcohol-based solvent is more preferable. Although (b2) is not limited especially as far as it is in a colloidal state within a dispersion solvent, it is more preferable that an average primary particle diameter can be from 1 to 100 nm, or furthermore from 5 to 60 nm, and it is especially preferable that it can be from 10 to 50 nm. A particle diameter of the colloidal silica (i.e., (b2)) being too large is not preferable, because the dispersibility of (b2) into an organic solvent, which is for and during the generation of Component (B), declines, and furthermore because the dispersibility of Component (B) into Component (E) (i.e., the claimed organic solvent) declines within the resulting composition.

Note that, in the present invention, the "average primary particle diameter" means values that are calculated from specific surface areas in accordance with the BET method.

Moreover, it is advisable that a specific surface area of (b2) can be from 5 to 3,000 m²/g, so common colloidal silicas can be involved in this range depending on the particle diameter.

A preferable synthesis process for Component (B) can be a process that comprises the steps of charging (b1) and (b2) in a predetermined mass ratio, respectively, in the presence of an organic solvent including water; and thereafter heating them to undergo reactions. Although it is not possible to prescribe the heating temperature and time in general because they depend on the reaction system's atmosphere and the presence or absence of catalyst, the latter can desirably be from 0.5 to 20 hours when the former can be from 40 to 140° C., or desirably from 60 to 120° C.

In Component (B), not only silica fine particles which are modified superficially with (b1), but also hydrolytic condensates of (b1) that do not include any silica fine particles may even be included, and so those including them are defined as Component (B).

Although a charging mass ratio between (b1) and (b2) can be from 1:9 to 9:1 upon synthesizing Component (B), it can more preferably be from 2:8 to 7:3, much more preferably from 2:8 to 6:4. By setting the mass ratio between (b1) and (b2) at from 1:9 to 9:1, it is possible to make the wear resistance and weatherability of the resulting cured films compatible with each other.

It is preferable that an amount of water to be charged into the reaction system can be from 0.3 to 10 mol, and it is more preferable that it can be from 0.5 to 5 mol, with respect to 1-mol alkoxy group. By setting the charging amount of water at from 0.3 to 10 mol with respect to 1-mol alkoxy group, it is possible to superficially modify the surface of silica fine particles efficiently without ever turning the silica fine particles into a gel.

As for the organic solvent, one which dissolves water uniformly is preferable; an alcohol-based solvent whose boiling point is from 100° C. to 200° C. is more preferable; and an alcohol-based solvent whose boiling point is from 100° C. to 200° C. and which has an ether bond is much more preferable.

As for specific examples of the preferable organic solvent, the following can be given: propylene glycohol monomethylether; propylene glycohol monoethylether; propylene glycohol monopropylether; propylene glycohol monobutylether; ethylene glycohol monomethylether; ethylene glycohol monoethylether; ethylene glycohol monopropylether; and ethylene glycohol monobutylether.

Note that, although Component (B) can be produced without any catalyst, it is advisable to add an acid catalyst or alkali catalyst. Moreover, it is also allowable to employ a polymerization inhibitor, or it is even permissible to introduce an oxygen-containing gas, such as air, into the reaction solution, for the purpose of preventing polymerization of the resulting maleimde groups.

After completing the reaction, it is allowable to remove water that is included within the reaction system. It is permissible to heat or depressurize the post-reaction solution in order to remove water and furthermore to distill away the organic solvent. On this occasion, it is preferable to add another organic solvent, whose boiling point is higher than that of water, to the post-reaction solution.

A content proportion of Component (B) in the composition according to the present invention can be from 1 to 35 parts by mass, or can more preferably be from 2 to 15 parts by mass, with respect to a sum of Component (A) and Component (B) being taken as 100 parts by mass.

By setting the content proportion of Component (B) at from 1 to 35 parts by mass, it is possible to adapt the composition into one from which cured films that are excellent in terms of wear resistance and weatherability are obtainable. When the proportion of Component (B) is 1 part by mass or more, the wear resistance of the resulting cured films upgrades. However, when Component (B) is too much, the weatherability declines because the resultant cured films become likely to contract or because decompositions of organic segments in the resulting cured films become quick.

Component (C): Radical-Polymerization Initiator

Component (C) according to the present invention is a radical-polymerization initiator, and it is possible to employ various compounds for it.

When a photo radical-polymerization initiator is employed as Component (C), the resulting composition works as a light curing-type coating-agent composition, and is cured by means of light irradiation. When a thermal radical-polymerization initiator is used as Component (C), the resultant composition works as a thermal curing-type coating-agent composition, and is cured by means of heating.

It is preferable that the composition according to the present invention can be a light curing-type coating-agent composition in which a photo radical-polymerization initiator is employed as Component (C), from such a viewpoint that it makes curing with lower energy and for a shorter period of time feasible, or it is excellent in terms of curability, and the like.

As for specific examples of the photo radical-polymerization initiator, the following can be given: acetophenone based compounds, such as 2,2-dimethoxy-1,2-diphenylethane-1-one, 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butane-1-one, diethoxyacetophenone, oligo{2-hydroxy-2-methyl-1-[4-(1-methylvinyl)phenyl]propanone} and 2-hydroxy-1-{4-[4-(2-hydroxy-2-methylpropionyl)benzyl]phenyl}-2-methyl-propane-1-one; benzophenone-based compounds, such as benzophenone, 4-phenylbenzophenone, 2,4,6-trimethylbenzophenone, 4-benzoyl-4'-methyl-diphenylsulfide; α-ketoester-based compounds, such as methyl benzoylformate, 2-(2-oxo-2-phenylacetoxyethoxy)ethyl ester of oxyphenyl acetic acid and 2-(2-hydroxyethoxy)ethyl ester of oxyphenyl acetic acid; phosphine oxide-based compounds, such as 2,4,6-trimethylbenzoyl diphenyl phosphine oxide, bis(2,4,6-trimethylbenzoyl)-phenylphosphine oxide, bis(2,6-dimethoxybenzoyl)-2,4,4-trimethylpentyl phosphine oxide; benzoin-based compounds, such as benzoin, benzoin methyl ether, benzoin ethyl ether, benzoin isopropyl ether and benzoin isobutyl ether; titanocene-based compounds; acetophenone/benzophenone-hybrid-based photo initiators, such as 1-[4-(4-benzoylphenylsulfanyl)phenyl]-2-methyl-2-(4-methylphenylsulfinyl)propane-1-one; and oxime ester-based photo polymerization initiators, such as 2-(O-benzoyloxime)-1-[4-(phenylthio)]-1,2-octanedione; as well as camphorquinone.

As for specific examples of the thermal radical-polymerization initiator, an organic peroxide, and an azo-based compound, and the like, can be named.

As for specific examples of the organic peroxide, the following can be given: 1,1-bis(t-butylperoxy)-2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl)propane, 1,1-bis(t-butylperoxy)cyclododecane, t-hexylperoxy isopropyl monocarbonate, t-butylperoxymaleic acid, t-butylperoxy-3,5,5-trimethylhexanoate, t-butyl peroxylaurate, 2,5-dimethyl-2,5-di(m-toluoylperoxy)hexane, t-butylperoxy isopropyl monocarbonate, t-butylperoxy 2-ethylhexyl monocarbonate, t-hexyl peroxybenzoate, 2,5-dimethyl-2,5-di(benzoylperoxy)hexane, t-butyl peroxyacetate, 2,2-bis(t-butylperoxy)butane, t-butyl peroxybenzoate, n-butyl-4,4-bis(t-butylperoxy) valerate, di-t-butyl peroxyisophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthanehydroperoxide, 2,5-dimethyl-2,5-di(t-butylperoxy)-3-hexene, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide.

As for specific examples of the azo-based compound, the following can be given: 1,1-azobis(cyclohexane-1-carbonitrile), 2-(carbamoylazo)isobutyronitrile, 2-phenylazo-4-methoxy-2,4-dimethylvaleronitrile, azo di-t-octane, and azo di-t-butane.

It is also allowable to use one of the above-enumerated radical-polymerization initiators independently, or it is even permissible to use two or more of them combinedly. Moreover, it is feasible to make the organic peroxides redox catalysts by means of combining them with a reducing agent.

A content proportion of Component (C) in the composition according to the present invention can be from 0.1 to 10 parts by mass, can more preferably be from 0.5 to 5 parts by mass, or can especially preferably be from 1 to 3 parts by mass, with respect to a sum of Component (A) and Component (B) being taken as 100 parts by mass.

By setting the content proportion of Component (C) at from 0.1 to 10 parts by mass, the resulting composition becomes one which is excellent in terms of curability, and so cured films are obtainable which are excellent in terms of wear resistance and weatherability.

Component (D): Ultraviolet Absorber

Component (D) according to the present invention is an ultraviolet absorber, and it is possible to employ various compounds or substances for it.

As for specific examples of the ultraviolet absorber, the following can be given: triazine-based ultraviolet absorbers, such as 2-[4-[(2-hydroxy-3-dodecyloxypropyl)oxy]-2-hydroxy-phenyl]-4,6-bis(2,4-dimethylphenyl)-1,3,5-triazine, 2-[4-[(2-hydroxy-3-tridecyloxypropyl)oxy]-2-hydroxy-phenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxy phenyl)-1,3,5-triazine, and 2-(2-hydroxy-4-[1-octyloxycarbonylethoxy]phenyl)-4,6-bis(4-phenylphenyl)-1,3,5-triazine; benzotriazole-based ultraviolet absorbers, such as 2-(2H-benzotriazol-2-yl)-4,6-bis(1-methyl-1-phenyl-ethyl)phenol, 2-(2-hydroxy-5-tert-butylphenyl)-2H-benzotriazole, and 2-[2-hydroxy-5-(2-(meth)acryloyloxyethyl) phenyl]-2H-benzotriazole; benzophenone-based ultraviolet absorbers, such as 2,4-dihydroxybenzophenone, and 2-hydroxy-4-methoxybenzophenone; cyanoacrylate-based ultraviolet absorbers, such as ethyl-2-cyano-3,3-diphenylacrylate, and octyl-2-cyano-3,3-diphenylacrylate; and inorganic fine particles, such as titanium oxide fine particles, zinc oxide fine particles, tin oxide fine particles, which absorb ultraviolet rays.

It is also allowable to use one of the above-enumerated ultraviolet absorbers independently, or it is even permissible to use two or more of them combinedly.

Of those above, containing one of the benzotriazole-based ultraviolet absorbers, which have a (meth)acryloyl group, leads to making it possible to make the weatherability and wear resistance of the resulting cured films compatible with each other. It is preferable to combinedly use one of the benzotriazole-based ultraviolet absorbers, which have a (meth)acryloyl group, as well as one of the triazine-based ultraviolet absorbers, from the standpoint of upgrading the resultant weatherability.

A content proportion of Component (D) in the composition according to the present invention can be from 1 to 12 parts by mass, can more preferably be from 3 to 12 parts by mass, or can especially preferably be from 4 to 11 parts by mass, with respect to a sum of Component (A) and Component (B) being taken as 100 parts by mass.

By setting the content proportion of Component (D) at from 1 to 12 parts by mass, it is possible to make the wear resistance and weatherability of the resulting cured films compatible with each other. When Component (D) is less than 1 part by mass, no cured films, which exhibit weatherability sufficiently, are obtainable. On the other hand, when Component (D) is too much, not only because the wear resistance of the resultant cured films declines, but also because the weatherability also tends to decline, Component (D) is set at 12 parts by mass or less. In particular, by setting the content proportion of Component (D) at from 4 to 11 parts by mass, cured films, in which excellent wear resistance and weatherability are made compatible with each other, are obtainable. Note that, in a case where a benzotriazole-based ultraviolet absorber and a triazine-based ultraviolet absorber are used combinedly, the advantage of upgrading weatherability can be effected even when an addition amount of the triazine-based ultraviolet absorber is such a small amount as 3 parts by mass or less, or furthermore from 2 to 3 parts by mass.

Component (E): Organic Solvent

Component (E) according to the present invention is a solvent, and it is possible to employ various compounds for it.

As for Component (E), it is preferable to use one which can uniformly disperse or dissolve Component (A), Component (B), Component (C) and Component (D), and additionally the other components being described later.

As for specific examples of preferable solvents, the following can be given: alcohols, such as ethanol, and isopropanol; alkylene glycol monoethers, such as ethylene glycol monomethylether, propylene glycol monomethylether, propylene glycol monoethylether, propylene glycol monopropylether, and propylene glycol monobutylether; aromatic compounds, such as toluene, and xylene; esters, such as propylene glycol monomethylether acetate, ethyl acetate, and butyl acetate; ketones, such as acetone, methyl ethyl ketone, and methyl isobutyl ketone; ethers, such as dibutyl ether; and diacetone alcohol; as well as N-methylpyrrolidone. Of these, the alkylene glycol monoethers, such as propylene glycol monomethylether, are especially preferable, not only because they are excellent in terms of dispersibility or solubility for each of the respective components, but also because, in a case where the resinous substrate, onto which the composition according to the present invention is applied, is made of polycarbonate resins, they do not dissolve the polycarbonate resins.

A content proportion of Component (E) in the composition according to the present invention can be from 10 to 1,000 parts by mass with respect to a sum of Component (A) and Component (B) being taken as 100 parts by mass. When a blending amount of Component (E) is too less, it is less likely to carry out coating uniformly; whereas it is less likely to obtain cured films with a sufficient thickness when it is too much. Therefore, the content proportion of Component (E) can preferably be from 50 to 500 parts by mass, or can more preferably be from 50 to 300 parts by mass, when prescribing it daringly, from the standpoint of productivity, although it is advisable to appropriately select the content proportion depending on coating methods.

Note that the content proportion of Component (E) shall involve organic solvents, which are present at the time of preparing the composition along with not only Components (A) through (D) but also later-described Component (F) and Component (G) as well as the other components.

Component (F): Hindered Amine-Based Light Stabilizer

Although the composition according to the present invention is one to which said Components (A) through (E) are indispensable, it is advisable to further blend a hindered amine-based light stabilizer (F) (hereinafter being referred to as "Component (F)") in order to upgrade the weatherability.

As for specific examples of the hindered amine-based light stabilizer, the following hindered amine-based light stabilizers can be given: bis(1,2,2,6,6-pentamethyl-4-piperidinyl) sebacate, methyl (1,2,2,6,6-pentamethyl-4-piperidinyl) sebacate, 2,4-bis[N-butyl-N-(1-cyclohexyloxy-2,2,6,6-tetramethyl-piperidin-4-yl)amino]-6-(2-hydroxyethylamine)-1,3,5-triazine, and decanedioic acid bis(2,2,6,6-tetramethyl-1-(octyloxy)-4-piperidinyl) ester.

Of these, those whose basicity of hindered amine is lower are preferable, from the viewpoint of the resulting composition's stability. To be concrete, those having an aminoether group, namely, so-called NOR-type ones, are more preferable.

As for a content proportion of Component (F), from 0.05 to 1.5 parts by mass, or furthermore from 0.1 to 1.5 parts by mass, with respect to a sum of Component (A) and Component (B) being taken as 100 parts by mass, is preferable.

Component (G): Surface Modifier

In order to enhance leveling property at the time of application, or in order to enhance the sliding property of the resulting cured films to enhance the scratch resistance, it is also advisable to further add various surface modifiers to the composition according to the present invention. As for the surface modifiers, it is possible to employ various additives for modifying superficial properties, which are commercially available under such a name as a surface-modifying agent, a leveling agent, a sliding-property imparting agent, or an anti-fouling-property imparting agent, and the like. Of those, silicone-based surface modifiers, and fluorine-based surface modifiers are suitable.

As for their specific examples, the following can be given: silicone-based polymers and oligomers, which have a silicone chain and polyalkylene oxide chain; silicone-based polymers and oligomers, which have a silicone chain and polyester chain; fluorine-based polymers and oligomers, which have a perfluoroalkyl group and polyalkylene oxide chain; and fluorine-based polymers and oligomers, which have a perfluoroalkyl ether chain and polyalkylene oxide chain. It is allowable to employ one or more types of these. For the purpose of enhancing and so forth the sustainability of the resulting sliding property, it is also permissible to employ one which contains a (meth)acryloyl group within the molecule.

A preferable blending amount of the surface modifier can be from 0.01 to 1.0 part by mass with respect to a sum of Component (A) and Component (B) being taken as 100 parts by mass. By setting the blending amount of the surface modifier at from 0.01 to 1.0 part by mass, it is possible to enhance the superficial flatness or smoothness of the resulting paint films.

Other Components

Although the composition according to the present invention is one to which said Components (A) through (E) are indispensable, it is possible to further blend various components in compliance with objectives. It is also allowable to blend one of aforementioned Component (F), Component (G) and below-enumerated other component independently, or it is even permissible to blend two or more species of them.

For the purpose of making the preservation stability of the composition according to the present invention satisfactory, it is preferable to add a radical-polymerization inhibitor to it.

As for specific examples of the polymerization inhibitor, the following can be given: hydroquinone, tert-butylhydroquinone, hydroquinone monomethyl ether, 2,6-di-tert-butyl-4-methyl phenol, 2,4,6-tri-tert-butyl phenol, benzoquinone, phenothiazine, N-nitroso phenylhydroxylamine, ammonium salts of N-nitroso phenylhydroxylamine, aluminum salts of N-nitroso phenylhydroxylamine, copper dibutyldithiocarbamate, copper chloride, and copper sulfate.

It is preferable to set an addition amount of the polymerization inhibitor at from 10 to 10,000 ppm, or it can more preferably be from 100 to 3,000 ppm, with respect to a sum of Component (A) and Component (B) being taken as 100 parts by mass.

For the purpose of making the heat resistance and weatherability of the resulting cured films satisfactory, it is also advisable to further add various oxidation inhibitors to the composition according to the present invention. As for some of the oxidation inhibitors, primary oxidation inhibitors, such as hindered phenol-based oxidation inhibitors; and sulfur-based and phosphorous-based secondary oxidation inhibitors can be named.

As for specific examples of the primary oxidation inhibitors, the following can be given: pentaerythritol tetrakis[3-(3,5-di-tert-butyl-4-hydroxyphenyl) propionate], ethylene bis (oxyethylene) bis[3-(5-tert-butyl-4-hydroxy-m-tolyl) propionate], and 1,3,5-tris[(4-tert-butyl-3-hydroxy-2,6-xylyl)methyl]-1,3,5-triazine-2,4,6(1H,3H,5H)-trione.

As for specific examples of the secondary oxidation inhibitors, the following can be given: didodecyl 3,3'-thiodipropionate, 4,6-bis(octylthiomethyl)-o-cresol, and tris(2,4-di-tert-butylphenyl)phosphite.

A preferable blending amount of the oxidation inhibitors can be from 0 to 5 parts by mass, or more preferably from 0 to 3 parts by mass, with respect to a sum of Component (A) and Component (B) being taken as 100 parts by mass.

It is also advisable to further add a compound, which is other than Component (A) and Component (B) and which has one or more radically-polymerizable unsaturated groups within one molecule, to the composition according to the present invention.

The compound having one radically-polymerizable unsaturated group within one molecule (hereinafter being referred to as "unsaturated compound") can be blended in order to enhance the adhesiveness between the resinous substrate and the resulting cured films.

As for the radically-polymerizable unsaturated group in the unsaturated compound, a (meth)acryloyl group is preferable.

As for a blending proportion of the unsaturated compound, it is preferable to set it at 20 parts by mass or less with respect to a sum of Component (A) and Component (B) being taken as 100 parts by mass, from the standpoint of preventing the resulting wear resistance and weatherability from worsening.

In the unsaturated compound, as for specific examples of compounds having one radically-polymerizable unsaturated group within one molecule, the following can be given: (meth)acrylic acid, Michael addition-type dimers of acrylic acid, ω-carboxy-polycaprolactone mono(meth)acrylate, monohydroxyethyl phthalate (meth)acrylate, methyl(meth)acrylate, ethyl(meth)acrylate, butyl(meth)acrylate, 2-ethylhexyl (meth)acrylate, benzyl(meth)acrylate, phenyl(meth)acrylate, (meth)acrylate in alkylene oxide adduct of phenol, (meth)acrylate in alkylene oxide adduct of alkylphenol, cyclohexyl (meth)acrylate, tert-butylcyclohexyl(meth)acrylate, 2-hydroxyethyl(meth)acrylate, 2-hydroxypropyl(meth)acrylate, 4-hydroxybutyl acrylate, (meth)acrylate in alkylene oxide adduct of paracumylphenol, orthophenylphenol(meth)acrylate, (meth)acrylate in alkylene oxide adduct of orthophenylphenol, tetrahydrofurfuryl(meth)acrylate, isobornyl (meth)acrylate, tricyclodecanemethylol(meth)acrylate, 2-hydroxy-3-phenoxypropyl(meth)acrylate, N-(2-(meth) acryloxyethyl)hexahydrophthalimide, N-(2-(meth)acryloxyethyl)tetrahydrophthalimide, N,N-dimethyl acrylamide, acryloylmorpholine, N-vinylpyrrolidone, and N-vinylcaprolactam.

In the unsaturated compound, it is also advisable to further blend another compound having two or more radically-polymerizable unsaturated groups within one molecule (hereinafter being referred to as "multi-functional unsaturated compound"). Including such another compound may lead to a case where the adhesiveness between the resulting cured films and the resinous substrate as well as the wear resistance of the resultant cured films can be improved.

It is preferable that a number of the radically-polymerizable unsaturated groups in the multi-functional unsaturated compound can be 3 or more within one molecule, and can more preferably be from 4 to 20, in order not to decline the resulting wear resistance.

As for a blending proportion of the multi-functional unsaturated compound, it is preferable to set it at 20 parts by mass or less with respect to a sum of Component (A) and Component (B) being taken as 100 parts by mass, from the standpoint of preventing the resulting weatherability from worsening.

As for the multi-functional unsaturated compound, a compound having two or more (meth)acryloyl groups within one molecule is preferable. As for its specific examples, the following compounds can be given: di(meth)acrylate in alkylene oxide adduct of bisphenol A, di(meth)acrylate in alkylene oxide adduct of bisphenol F, di(meth)acrylate in alkylene oxide adduct of bisphenol Z, di(meth)acrylate in alkylene oxide adduct of bisphenol S, di(meth)acrylate in alkylene oxide adduct of thiobisphenol, di(meth)acrylate of bisphenol A, di(meth)acrylate of bisphenol F, di(meth)acrylate of bisphenol Z, di(meth)acrylate of bisphenol S, di(meth)acrylate of thiobisphenol, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerine di(meth)acrylate, di(meth)acrylate in alkylene oxide adduct of glycerine, dimer acid diol di(meth)acrylate, cyclohexanedimethylol di(meth)acrylate, trimethylolpropane tri(meth)acrylate, tri(meth)acrylate in alkylene oxide adduct of trimethylolpropane, tri- and tetra-acrylates of pentaerythritol, tri- and tetra-acrylates in alkylene oxide adduct of pentaerythritol, ditrimethylolpropane tetra(meth)acrylate, dipentaerythritol hexa- and penta-acrylates, polyester(meth)acrylate, epoxy(meth)acrylate, urethane(meth)acrylate, and silicone resins having a (meth)acryloyl group at the ends.

As for the polyester (meth)acrylate, dehydrated condensates between polyester polyol and (meth)acrylic acid can be named. As for the polyester polyol, reaction products being made from low-molecular-weight polyols and acid components can be named. Moreover, the low-molecular-weight polyols can be ethylene glycol, polyethylene glycol, cyclohexanedimethylol, 3-methyl-1,5-pentanediol, propylene glycol, polypropylene glycol, 1,6-hexanediol, and trimethylollpropane, as well as polyols in alkylene oxide adducts and the like of these low-molecular-weight polyols. In addition, the acid components can be a dibasic acid, such as adipic acid, succinic acid, phthalic acid, hexahydrophthalic acid and terephthalic acid, or their anhydrides. Moreover, dehydrated condensates between various dendrimer-type polyols and (meth)acrylic acid can be named.

As for the epoxy(meth)acrylate, the following can be given: (meth)acrylic acid adducts of bisphenol type-A epoxy resins, (meth)acrylic acid adducts of hydrogenated bisphenol type-A epoxy resins, (meth)acrylic acid adducts of phenol or cresol novolac-type epoxy resins, (meth)acrylic acid adducts of biphenyl-type epoxy resins, (meth)acrylic acid adducts in diglycidyl ether of polyether, such as polytetramethylene glycol, (meth)acrylic acid adducts in diglycidyl ether of polybutadiene, (meth)acrylic acid adducts of internal epoxide in polybutadiene, (meth)acrylic acid adducts of silicone resins having an epoxy group, (meth)acrylic acid adducts of limonene dioxide, and (meth)acrylic acid adducts of 3,4-epoxycyclohexylmethyl-3,4-epoxycyclohexanecarboxylate.

As for the urethane(meth)acrylate, the following can be given: compounds in which organic polyisocyanate and hydroxyl group-containing (meth)acrylate have undergone an addition reaction; and compounds in which organic polyisocyanate, polyol and hydroxyl group-containing (meth)acrylate have undergone an addition reaction.

Here, as for some of the polyols, the following can be given: low-molecular-weight polyols, polyether polyol, polyester polyol, and polycarbonate polyol.

As for some of the low-molecular-weight polyols, the following can be given: ethylene glycol, propylene glycol, neopentyl glycol, cyclohexanedimethylol, 3-methyl-1,5-pentaediol, and glycerin.

As for the polyether polyol, polypropylene glycol, and polytetramethylene glycol can be named.

As for the polyester polyol, reaction products can be named, reaction products which are made between these low-molecular-weight polyols (and/or the polyether polyols) and acid components, such as dibasic acids, like adipic acid, succinic acid, phthalic acid, hexahydrophthalic acid and terephthalic acid, or their anhydrides.

As for the organic polyisocyanate, the following can be given: tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate.

As for the hydroxyl group-containing (meth)acrylate, the following can be given: hydroxyalkyl(meth)acrylate, such as 2-hydroxyethyl(meth)acrylate, 2-hydroxypropyl(meth)acrylate, and 4-hydroxybutyl(meth)acrylate; or hydroxyl group-containing multi-functional (meth)acrylate, such as pentaerythritol tri(meth)acrylate, and dipentaerythritol penta(meth)acrylate.

It is also allowable to use one of the above-enumerated unsaturated compounds independently, or it is even permissible to use two or more of them combinedly.

For the purpose of reducing warpage at the time of curing while maintaining transparency, and the like, it is also possible to further blend an organic polymer into the composition according to the present invention. As for a suitable polymer, (meth)acryl-based polymers can be named. As for a suitable constituent monomer, the following can be given: methyl (meth)acrylate, cyclohexyl(meth)acrylate, (meth)acrylic acid, glycidyl(meth)acrylate, and N-(2-(meth)acryloxyethyl) tetrahydrophthalimide. In a case where polymers are made by copolymerizing (meth)acrylic acid, it is also advisable to introduce a (meth)acryloyl group into the polymer chain by adding glycidyl(meth)acrylate to it.

Preparation Method

It is possible to produce the composition according to the present invention by weighing Components (A) through (E), which have been explained already, as well as the other components, such as Component (F) and Component (G), if needed, in a predetermined amount, respectively, and then stirring and mixing them.

Coating Method and Curing Method

The curing-type coating-agent composition according to the present invention is applied onto a surface of substrate to which it is desired to impart wear resistance and weatherability.

As for a substrate to which the composition according to the present invention is applicable, it is possible to name plastic, metal, or concrete, and the like, because the composition is applicable to various materials being employed outside. Moreover, there are not any limitations on the substrate's configuration.

The composition according to the present invention is applicable preferably to plastic being employed outside especially. As for specific example of the plastic, the following can be given: polycarbonate resins, polymethyl methacrylate, polyethylene terephthalate, polyvinyl chloride, epoxy resins, and polyurethane resins. However, more preferable ones are polycarbonate resins, and polymethyl methacrylate; and especially preferable ones are polycarbonate resins.

It is allowable to follow conventional methods to do a coating method for the curing-type coating-agent composition according the present invention. For example, the following are preferable: spraying methods, spin coating methods, dip coating methods, bar coating methods, and flow coating methods; and it is permissible to select one of them depending on configurations of the substrate. On this, occasion, when one of the opposite surfaces of the substrate is made so as not to be exposed to the composition according to the present invention for a long period of time, degradations of the substrate due to organic solvents can be inhibited.

It is advisable to appropriately set up a film thickness of coated films that are formed by means of coating depending on objectives. For example, the thicker the thickness of the resulting cured films is, the more the weatherability upgrades. However, making it too thick is not desirable, from the appearance of the resultant cured films and from the standpoint of productivity. Taking weatherability, appearance and productivity into consideration, it is desirable to set the film thickness of post-curing coated films within a range of from 5 to 50 μm, or furthermore from 10 to 40 μm.

It is advisable to appropriately select a temperature for drying the coated films depending on heat resistance of the substrate. When the substrate is made of resin, the temperature can be the resin's softening point or less. For example, in a case of polycarbonate resin, it is preferable to set the temperature within a range of from 50 to 120° C.

In a case where the composition according to the present invention is a light curing-type composition, it is advisable to dry the composition after it is applied onto the substrate, and then to irradiate it with light, such as ultraviolet rays. As for a preferable manufacturing method, it is possible to name a method in which the post-drying substrate is irradiated with light in such a state that it is maintained at high temperatures.

In a case where the composition according to the present invention is a light curing-type composition, as for the temperature when irradiating the composition with an ultraviolet ray, and the like, after drying it, although the temperature shall not be limited especially as far as it is a temperature or less at which the performance of substrate materials can be maintained, it can preferably fall within a range of from 50° C. to 200° C. For example, in the case of polycarbonate resin, it is preferable to set the temperature within a range of from 50 to 120° C., more preferably from 60 to 110° C., much more preferably from 70 to 100° C., and especially preferably from 80 to 100° C. By maintaining a temperature of the substrate within a range of from 50 to 120° C. when irradiating it with ultraviolet rays, it is possible to enhance the wear resistance of the resulting cured films.

As for some of the light, although ultraviolet rays and visible rays can be named, ultraviolet rays are preferable especially.

As for some of ultraviolet irradiation devices, high pressure-mercury lamps, metal halide lamps, electrodeless UV lamps, and LEDs can be named. In the case of electrodeless UV lamps, it is possible to suitably employ those of new types that are operated by means of current resulting from direct-current power source.

An irradiation energy shall be set up appropriately depending on the types of active energy rays or the blending compositions. However, the following can be given as one of such examples in a case where a high-pressure mercury lamp is employed: the irradiation energy can preferably be from 100 to 10,000 mJ/cm², or more preferably from 1,000 to 6,000 mJ/cm², by irradiation energy in UV-A region.

In a case where the composition according to the present invention is a thermo curing-type composition, it is advisable to dry the composition after it is applied onto the substrate, and then to heat it furthermore. As for a heating temperature, although it shall not be limited especially as far as it is a temperature or less at which the performance of substrate materials can be maintained, it can preferably be from 80 to 200° C.

As for a heating time, it can preferably be from 10 minutes or more to 120 minutes or less. When viewing it from the standpoint of productivity, it is advisable to set it at 60 minutes or less, or furthermore 30 minutes or less.

Note that it is also allowable to carryout the curing of the composition in air, or it is even permissible to carry it out in a vacuum, or in an inert-gas environment. Although it is preferable to carry out the curing in a vacuum, or in an inert-gas atmosphere, in view of prospective performance of the resulting cured films, it is also advisable to carry it out in air, from the viewpoint of productivity.

In the present description, the temperatures for drying and heating are the superficial temperature of coated films, and are virtually equal to an atmospheric temperature in the drying or heating.

So far, explanations have been made on some of the embodiment modes of the curing-type coating-agent composition according to the present invention. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, examples and comparative examples will be exhibited, thereby explaining the present invention in more detail. Note the present invention shall not be limited at all by these examples.

In what follows, "parts" means parts by mass, and "%" means % by mass. Moreover, multi-functional urethane (meth)acrylates other than aforementioned Component (A), which do not correspond to Component (A), will be hereinafter referred to as Component (A)'. In addition, colloidal silicas (i.e., involatile components from which dispersion media were got rid of), which did not correspond to Component (B), will be referred to as Component (B)'. That is, colloidal silicas other than aforementioned Component (B) will be referred to as Component (B)'. Note that a composition including Component (B)', which did not include any colloidal silica but which included an alkokysilane condensate including a (meth)acryloyl group as a function group, will be labeled a "Reference Example."

(1) Production Example No. 1

Production of Component (A) ("IPDI-M313")

The following were charged into a 2-L separable flask, which was equipped with a stirring device and an air-blowing tube: 1,430-g di- and tri-acrylates in 3-mol ethylene oxide adduct of isocyanuric acid (containing diacrylate in an amount of 1 mol) (hereinafter being referred to as "M-313"); 0.77-g 2,6-di-tert-butyl-4-methylphenol (hereinafter being referred to as "BHT"); and 0.46-g dibutyl tin dilaurate (hereinafter being referred to as "DBTL"). Then, 111-g (i.e., 0.5-mol) isophorone diisocyanate (hereinafter being referred to as "IPDI") was dropped into them while stirring them at a liquid temperature of from 70 to 75° C.

For "M-313," ARONIX M-313 produced by TOAGOSEI Co., Ltd. was used.

After completing the dropping, they were further stirred at 85° C. for 2 hours, and their reactions were terminated after confirming the disappearance of isocyanate groups in the resulting reaction product by IR (or infrared absorption) analysis, thereby obtaining an isocyanuric ring-containing acrylate mixture. Hereinafter, this reaction product will be called "IPDI-M313."

"IPDI-M313" was a mixture that contained a urethane adduct compound (a1) (namely, a reaction product between a compound according aforementioned General Formula (1) and isophorone diisocyanate), and a tri(meth)acrylate compound (a2) being expressed by General Formula (2) in a mass ratio of (a1):(a2)=3:7.

These compounds corresponded respectively to a compound according to General Formula (1) wherein all of $R^1$, $R^2$ and $R^3$ were an ethylene group, respectively, all of $R^4$ and $R^5$ were a hydrogen atom, respectively, $n^1$, $n^2$ and $n^3$ were 1, respectively, and $n^1+n^2+n^3$ was 3; and another compound according to General Formula (2) wherein all of $R^6$, $R^7$ and $R^8$ were an ethylene group, respectively, all of $R^9$, $R^{10}$ and $R^{11}$ were a hydrogen atom, respectively, $n^4$, $n^5$ and $n^6$ were 1, respectively, and $n^4+n^5+n^6$ was 3.

(2) Production Example No. 2

Production of Component (A) ("HDI-M313")

The following were charged into a flask, which was identical with that in Production Example No. 1: 1,430-g "M313" (containing diacrylate in an amount of 1 mol); 0.76-g "BHT"; and 0.45-g "DBTL." Then, 84-g (i.e., 0.5-mol) hexamethylene diisocyanate (hereinafter being referred to as "HDI") was dropped into them while stirring them at a liquid temperature of from 70 to 75° C.

After completing the dropping, they were further stirred at 85° C. for 2 hours, and their reactions were terminated after confirming the disappearance of isocyanate groups in the resulting reaction product by IR (or infrared absorption) analysis, thereby obtaining an isocyanuric ring-containing acrylate mixture. Hereinafter, this reaction product will be called "HDI-M313."

"HDI-M313" was a mixture that contained a urethane adduct compound (a1) (namely, a reaction product between a compound according aforementioned General Formula (1) and hexamethylene diisocyanate), and a tri(meth)acrylate compound (a2) being expressed by General Formula (2) in a mass ratio of (a1):(a2)=3:7.

These compounds corresponded respectively to a compound according to General Formula (1) wherein all of $R^1$, $R^2$ and $R^3$ were an ethylene group, respectively, all of $R^4$ and $R^5$ were a hydrogen atom, respectively, $n^1$, $n^2$ and $n^3$ were 1, respectively, and $n^1+n^2+n^3$ was 3; and another compound according to General Formula (2) wherein all of $R^6$, $R^7$ and $R^8$ were an ethylene group, respectively, all of $R^9$, $R^{10}$ and $R^{11}$ were a hydrogen atom, respectively, $n^4$, $n^5$ and $n^6$ were 1, respectively, and $n^4+n^5+n^6$ was 3.

(3) Production Example No. 3

Production of Component (A)' ("IPDI-M305")

The following were charged into a flask, which was identical with that in Production Example No. 1: 993-g tri- and tetra-acrylates of pentaerythritol (containing tri-acrylate in an amount of 2 mol) (hereinafter being referred to as "M-305"); 0.61-g "BHT"; and 0.36-g "DBTL." Then, 222-g (i.e., 1.0-mol) "IPDI" was dropped into them while stirring them at a liquid temperature of from 70 to 75° C.

For "M-305," ARONIX M-305 produced by TOAGOSEI Co., Ltd. was used.

After completing the dropping, they were further stirred at 85° C. for 2 hours, and their reactions were terminated after confirming the disappearance of isocyanate groups in the resulting reaction product by IR (or infrared absorption) analysis, thereby obtaining a multi-functional urethane acrylate.

Hereinafter, this reaction product will be called "IPDI-M305."

(4) Production Example No. 4

Production of Component (b1)
("THPI-Alkoxysilane")

The following were charged into a 3-L separable flask, which was equipped with a stirrer: 1,119-g toluene; and 456-g (i.e., 3.0-mol) 3,4,5,6-tetrahydrophthalic anhydride. Then, 663-g (i.e., 3.0-mol) 3-aminopropyltriethoxysilane was dropped into them in the presence of nitrogen while stirring them at room temperature. After completing the dropping, they were increased in the temperature until ethanol was distilled away, and subsequently they were further reacted for 4 hours while keeping the reaction liquid within a range of from 85 to 110° C.

After completing their reactions, low-boiling-point components, such as toluene and ethanol, were distilled away by decompression while heating the flask in an 80° C. oil bath, thereby synthesizing an alkoxysilane compound (b1). Hereinafter, this reaction product will be called "THPI-Alkoxysilane."

It was ascertained by means of $^1$H-NMR spectrum that the thus obtained "THPI-Alkoxysilane" had a structure that was made of a compound according to said General Formula (3) and General Formula (4) wherein $R^{13}$ and $R^{14}$ were saturated hydrocarbon groups (i.e., tetramethylene groups) that were unified to form a six-membered ring, $R^{15}$ was a trimethylene group, $R^{12}$ was an ethyl group, and "z" was 1.2.

The resulting "THPI-Alkoxysilane" was employed as a raw material (b1) in later-described Production Example No. 5 through Production Example No. 8.

(5) Production Example No. 5

Production of Component (B) ("THPI-Silica-1")

The following were charged into a 1-L separable flask, which was equipped with a stirrer and a cooling tube: 47.2 g of "THPI-Alkoxysilane"; 240-g propylene glycol monomethylether (hereinafter being referred to as "PGM"); and 5.9-g water. Then, they were stirred and then dissolved one another at room temperature. Thereafter, an isopropyl alcohol (hereinafter being referred to as "IPA")-dispersion colloidal silica (hereinafter being simply referred to as "IPA-ST") was further charged into the flask in an amount of 200 g. On this occasion, a mass ratio between Component (b1) and Component (b2) was 44:56.

For "IPA-ST," IPA-ST (a product of NISSAN CHEMICAL INDUSTRIES, Ltd.) was used, IPA-ST which exhibited an average particle diameter of from 10 to 15 nm (e.g., values being calculated from the specific surface areas according to the BET method), had solid contents in an amount of 30%, and contained "IPA" in an amount of 70%.

After heating this colloidal dispersion liquid at 80° C. in the presence of nitrogen to react it for 4 hours, it was condensed by distilling IPA, water, and the like, away until the resulting nonvolatile component accounted for 50%. Subsequently, 240-g "PGM" was further added to it, and then a small amount of water, and so forth, which remained in the reaction system, was further distilled away along with "PGM," and so on, thereby obtaining reaction products with 50% nonvolatile component. Hereinbelow, of the reaction products being obtained herein, the nonvolatile component (i.e., Component (B)), from which solvents etc. were got rid of, will be called "THPI-Silica-1."

(6) Production Example No. 6

Production of Component (B) ("THPI-Silica-2")

The following were charged into a 500-mL separable flask, which was equipped with a stirrer and a cooling tube: 11.8 g of "THPI-Alkoxysilane"; 160-g "PGM"; and 1.5-g water. Then, they were stirred and then dissolved one another at room temperature. Thereafter, "IPA-ST" was further charged into the flask in an amount of 133.3 g. On this occasion, a mass ratio between Component (b1) and Component (b2) was 23:77.

This colloidal dispersion liquid was reacted by the same operations and under the same conditions as those in Production Example No. 5 in order to distil away and then condense the resulting nonvolatile component. Subsequently, 160-g "PGM" was further added to it, and then a small amount of water, and so forth, which remained in the reaction system, was further distilled away along with "PGM," and so on, thereby obtaining reaction products with 50% nonvolatile component. Hereinbelow, of the reaction products being obtained herein, the nonvolatile component (i.e., Component (B)), from which solvents etc. were got rid of, will be called "THPI-Silica-2."

(7) Production Example No. 7

Production of Component (B) ("THPI-Silica-3")

The following were charged into a 500-mL separable flask, which was equipped with a stirrer and a cooling tube: 11.8 g of "THPI-Alkoxysilane"; 160-g "PGM"; and 1.5-g water. Then, they were stirred and then dissolved one another at room temperature. Thereafter, an "IPA"-dispersion colloidal silica (hereinafter being simply referred to as "IPA-ST-L") was further charged into the flask in an amount of 133.3 g. On this occasion, amass ratio between Component (b1) and Component (b2) was 23:77.

For "IPA-ST-L," IPA-ST-L (a product of NISSAN CHEMICAL INDUSTRIES, Ltd.) was used, IPA-ST-LA which exhibited an average particle diameter of from 40 to 50 nm (e.g., values being measured by means of the BET method), had solid contents in an amount of 30%, and contained "IPA" in an amount of 70%.

This colloidal dispersion liquid was reacted by the same operations and under the same conditions as those in Production Example No. 5 in order to distil away and then condense the resulting nonvolatile component. Subsequently, 160-g "PGM" was further added to it, and then a small amount of water, and so forth, which remained in the reaction system, was further distilled away along with "PGM," and so on, thereby obtaining reaction products with 50% nonvolatile component. Hereinbelow, of the reaction products being obtained herein, the nonvolatile component (i.e., Component (B)), from which solvents etc. were got rid of, will be called "THPI-Silica-3."

(8) Production Example No. 8

Production of Component (B) ("THPI-Silica-4")

The following were charged into a 500-mL separable flask, which was equipped with a stirrer and a cooling tube: 57.6 g of "THPI-Alkoxysilane"; 57.6-g "PGM"; and 14.4-g water. Then, they were stirred and then dissolved one another at room temperature. Thereafter, "IPA-ST" was further charged into the flask in an amount of 93.3 g. On this occasion, a mass ratio between Component (b1) and Component (b2) was 67:33.

This colloidal dispersion liquid was reacted by the same operations and under the same conditions as those in Production Example No. 5 in order to distil away and then condense the resulting nonvolatile component. Subsequently, the following procedure was repeated three times in order to obtain reaction products: 58-g "PGM" was further added to the nonvolatile component; and then a small amount of water, and so forth, which remained in the reaction system, was further distilled away along with "PGM," and so on, in order to condense the nonvolatile component to 50%. Hereinbelow, of the reaction products being obtained herein, the nonvolatile component (i.e., Component (B)), from which solvents etc. were got rid of, will be called "THPI-Silica-4."

(9) Production Example No. 9

Production of Component (b1) ("CI-Alkoxysilane")

The following were charged into a 2-L separable flask, which was equipped with a stirrer: 400-g toluene; 134.4-g (i.e., 1.2-mol) citraconic anhydride; and 0.29-g hydroquinone momomethylether (hereinafter being referred to as "MQ"). Then, 265.2-g (i.e., 1.2-mol) 3-aminopropyltriethoxysilane was dropped into them while stirring them at room temperature. After completing the dropping, they were increased in the temperature until ethanol was distilled away, and subsequently they were further reacted for 4 hours while keeping the reaction liquid within a range of from 100 to 110° C.

After completing their reactions, low-boiling-point components, such as toluene and ethanol, were distilled away by decompression while heating the flask in an 80° C. oil bath, thereby synthesizing an alkoxysilane compound (b1). Hereinafter, this reaction product will be called "CI-Alkoxysilane."

It was ascertained by means of $^1$H-NMR spectrum that the thus obtained "CI-Alkoxysilane" had a structure that was made of a compound according to said General Formula (3) and General Formula (4) wherein one of $R^{13}$ and $R^{14}$ was a hydrogen atom and the other one was a methyl group, $R^{15}$ was a trimethylene group, $R^{12}$ was an ethyl group, and "z" was 1.1.

The resulting "CI-Alkoxysilane" was employed as a raw material (b1) in next Production Example No. 10.

(10) Production Example No. 10

Production of Component (B) ("CI-Silica")

The "CI-Alkoxysilane" was dissolved in "PGM" in a concentration of 50%, and a white-colored residual was then filtered out in a very trace amount to obtain a light-yellow-colored transparent solution. Then, the following were charged into a 300-mL separable flask, which was equipped with a stirrer and a cooling tube: 73.4 g of this solution (comprising 36.7-g "CI-Alkoxysilane" and 36.7-g "PGM"); 10.8-g water; and 14 mg of an aluminum salt of N-nitro phenylhydroxylamine (e.g., "Q-1301" produced by WAKO JUNYAKU KOGYO, Co., Ltd.), a polymerization inhibitor. Moreover, they were stirred and then dissolved one another at room temperature. Thereafter, the "IPA-ST" was further charged into the flask in an amount of 50 g. On this occasion, a mass ratio between Component (b1) and Component (b2) was 71:29.

After reacting this colloidal dispersion liquid for 4 hours by heating it at 80° C. in the presence of air, the "IPA," water, and the like, were distilled away until the resulting nonvolatile component accounted for about 50%. Subsequently, the following procedure was repeated three times in order to obtain reaction products: 37-g "PGM" was further added to the nonvolatile component; and then a small amount of water, and so forth, which remained in the reaction system, was further distilled away along with "PGM," and so on, in order to condense the nonvolatile component to 50%. Hereinbelow, of the reaction products being obtained herein, the nonvolatile component (i.e., Component (B)), from which solvents etc. were got rid of, will be called "CI-Silica."

(11) Production Example No. 11

Production of Component (B)' ("Methacryl-Silica")

The following were charged into a 500-mL separable flask, which was equipped with a stirrer and a cooling tube: 37.2-g (i.e., 0.15-mol) 3-methacryloxypropyl trimethoxysilane; 120-g "PGM"; 26 mg of an aluminum salt of N-nitroso phenylhydroxylamine (e.g., "Q-1301" produced by WAKO JUNYAKU KOGYO, Co., Ltd.), a polymerization inhibitor; 90 g of the "IPA-ST"; and 8.1-g water. Then, they were stirred and then dissolved one another at room temperature.

After reacting this colloidal dispersion liquid for 4 hours by heating it at 80° C. in the presence of air, the "IPA," water, and the like, were distilled away until the resulting nonvolatile component accounted for about 50%. Subsequently, the following procedure was repeated three times in order to obtain reaction products: 120-g "PGM" was further added to the nonvolatile component; and then a small amount of water, and so forth, which remained in the reaction system, was further distilled away along with "PGM," and so on, in order to condense the nonvolatile component to 50%. Hereinbelow, of the reaction products being obtained herein, the nonvolatile component (i.e., Component (B)'), from which solvents etc. were got rid of, will be called "Methacryl-Silica."

(12) Production Example No. 12

Production of Component (B)'

Production of Organosilicon Compound

After charging 150-g 1-propanol for alcohol exchange reaction and 36.53-g (i.e., 0.24-mol) tetramethoxy silane (hereinafter being referred to as "TMOS") into a reactor being equipped with a stirrer and a thermometer, 4.37-g methanol solution of 25%-by-mass tetramethylammonium hydroxide (i.e., 0.1-mol methanol, and 12-millimol tetramethylammonium hydroxide) was added to those above gradually while stirring them, and was reacted with them at a temperature of 25° C. under pH 9 for 6 hours. Thereafter, their internal temperature was set at 60° C., and then they were further reacted for another one hour while stirring them. Note herein that, when the reaction liquid was analyzed by gas chromatography (or TCD detector), the following were detected: compounds, in which the methoxy groups of the "TMOS" were replaced by a n-propoxy group, respectively (from monosubstituted product to tetrasubstituted product); and the unreacted "TMOS." Moreover, the "TMOS" was detected only in a trace amount. Of these, a proportion of compounds containing a n-propoxy group was virtually 100% in total. Based on a peak area of the products in gas chromatography, a substitution number of 1-propanol (i.e., an averaged number of n-propoxy group per one molecule of the compounds containing a n-propoxy group) was found to be 2.7.

Next, 59.62-g (i.e., 0.24-mol) 3-methacryloxypropyl trimethoxysilane was added to the aforementioned reaction liquid, and 30.2-g water was further added to it. And, 7.88-g methanol solution of 25% tetramethylammonium hydroxide (i.e., 0.18-mol methanol, and 21.6-millimol tetramethylammonium hydroxide) was further added to the reaction liquid while stirring it, and was reacted with it at a temperature of 25° C. under pH 9 for 24 hours. Thereafter, 22.2-g (i.e., 35.3-millimol) aqueous solution of 10%-by-mass nitric acid was added to neutralize the reaction liquid. Subsequently, the resulting neutralized liquid was added into a mixed liquid of 120-g diisopropyl ether and 180-g water in order to carry out extraction. Salts and excessive acid were removed by washing the resultant diisopropyl ether layer with water. Thereafter, an aluminum salt of N-nitroso phenylhydroxylamine (e.g., "Q-1301 (trade name)" produced by WAKO JUNYAKU KOGYO, Co., Ltd.), which served as a polymerization inhibitor, was added to the diisopropyl ether layer in an amount of 11.5 mg. The organic solvents were distilled away from the thus obtained diisopropyl ether solution under decompression, thereby obtaining an organosilicon compound as a colorless transparent solid. Its yield was 57.72 g.

The organosilicon compound was analyzed by $^1$H-NMR, and it was then ascertained that the thus obtained organosilicon compound was a copolycondensate that was obtained by reacting 3-methacryloxypropyl trimethoxysilane and tetrapropoxy silane stoichiometrically.

A content proportion of alkoxy group (i.e., n-propoxy group being bonded to silicon atom), which was calculated from $^1$H-NMR chart of the organosilicon compound, was such an amount that was equivalent to 2.5% with respect to the entirety of alkoxy groups that were included in the charged raw materials. Moreover, the $M_n$ was 9,600. Hereinafter, this reaction product will be called "Mac-TQ."

Example No. 1 through Example No. 11,
Comparative Example No. 1 through Comparative
Example No. 7, and Reference Example No. 1

An ordinary method was followed to stir and then mix components shown in Table 1 and Table 3, thereby producing light curing-type coating-agent compositions. Compositions according to the respective examples (i.e., #E1 through E11) are given in Table 1, and compositions according to the respective comparable examples (i.e., #C1 through C7) and composition according to the reference example (i.e., #C0) are given in Table 3.

Note that numeric values of the respective components in Table 1 and Table 3 are expressed as the numbers of parts by mass. The symbol, "-," means to be "unblended." Moreover, abbreviations in the tables express the following compounds.

ABBREVIATIONS (i) Component (A)

"IPDI-M313": Reaction Product according to Production Example No. 1; and
"HDI-M313": Reaction Product according to Production Example No. 2

(ii) Component (A)'

"IPDI-M305": Reaction Product according to Production Example No. 3

(iii) Component (B)

"THPI-Silica-1": Reaction Product (or Nonvolatile Component) according to Production Example No. 5;
"THPI-Silica-2": Reaction Product (or Nonvolatile Component) according to Production Example No. 6;
"THPI-Silica-3": Reaction Product (or Nonvolatile Component) according to Production Example No. 7;
"THPI-Silica-4": Reaction Product (or Nonvolatile Component) according to Production Example No. 8; and
"CI-Silica": Reaction Product (or Nonvolatile Component) according to Production Example No. 10

(iv) Component (B)'

"IPA-ST(NV)": Isopropyl Alcohol-dispersion Colloidal Silica Produced by NISSAN CHEMICAL INDUSTRIES, Ltd., or Nonvolatile Component (30% content) in IPA-ST (trade name);
"Methacryl-Silica": Reaction Product (or Nonvolatile Component) according to Production Example No. 11; and
"Mac-TQ": Reaction Product (or Nonvolatile Component) according to Production Example No. 12

(v) Component (C)

"Irg-819": Photo Radical-polymerization initiator produced by CHIBA JAPAN Co., Ltd., under Trade Name of "IRGACURE 819," namely, bis(2,4,6-trimethylbenzoyl)-phenylphosphine oxide (vi) Component (D)

"RUVA-93": Benzotriazole-based Ultraviolet Absorber having a methacryloyl group, a product of OTSUKA KAGAKU Co., Ltd., under Trade Name of "RUVA-93," namely, 2-[2-hydroxy-5-(2-methacryloyloxyethyl)phenyl]-2H-benzo triazole; and
"T-479": Triazine-based Ultraviolet Absorber, a product of CHIBA JAPAN Co., Ltd., under Trade Name of "TINUVIN 479," namely, 2-(2-hydroxy-4-[1-octyloxycarbonylethoxy] phenyl)-4,6-bis(4-phenylphenyl)-1,3,5-triazine (vii) Component (E)

"PGM": Propylene Glycol Monomethylether;
"Solvent in DAC": Solvent (80% content) in Fluorine-based Surface Modifier, a product of DAIKIN KOGYO Co., Ltd., under Trade Name of "OPTOOL DAC-HP"; and "Solvent in IPA-ST)": Dispersion Medium in Isopropyl Alcohol-dispersion Colloidal Silica, a product of NISSAN CHEMICAL INDUSTRIES, Ltd., under Trade Name of IPA-ST (viii) Component (F)

"T-123": Hindered Amine-based Light Stabilizer, a product of CHIBA JAPAN Co., Ltd., under Trade Name of "TINUVIN 123," namely, decanedioic acid bis(2,2,6,6-tetramethyl-1-(octyloxy)-4-piperidinyl) ester (ix) Component (G)

"DAC (NV)": Effective Ingredient (20% content) in Fluorine-based Surface Modifier, a product of DAIKIN KOGYO Co., Ltd., under Trade Name of "OPTOOL DAC-HP"; and
"8019add": Silicone-based Surface Modifier (or leveling agent), a product of DOW CORNING TORAY Co., Ltd., under Trade Name of "8019 ADDITIVE," with 10% Effective Ingredient Note that the colloidal silica's average particle diameter (or value being calculated from the specific surface area according to the BET method) is an average primary particle diameter, and is a catalogue value for which the dispersions or variations between the product's lots are taken into account.

Structures of effective ingredients in Component (D) and Component (F) are illustrated below.

(Chemical Formula 10)

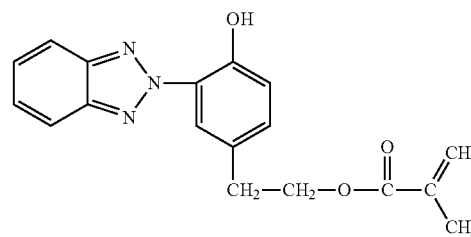

(RUVA-93)

(Chemical Formula 11)

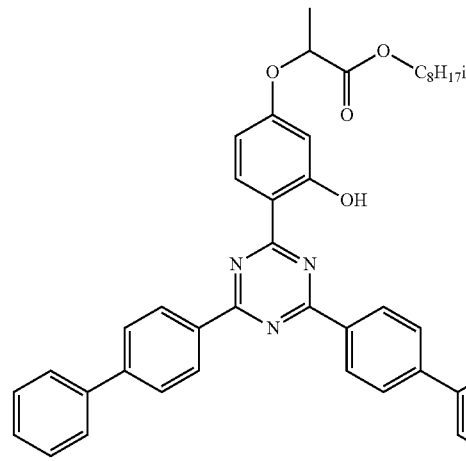

(T-479)

-continued (Chemical Formula 12)

(T-123)

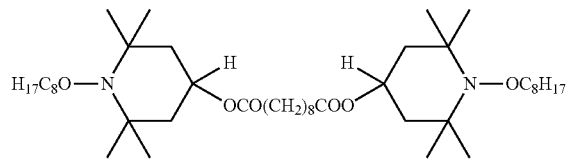

Compositions shown in Table 1 and Table 3 were applied onto a surface of a 10-cm square polycarbonate resin plate, respectively, using a bar coater so that a post-drying paint-film thickness became about 10 μm. After drying the resulting paint films at 100° C. for 10 minutes using a hot-air dryer, an ultraviolet irradiation operation was immediately carried out onto the paint films whose paint-film superficial temperature was 90° C., thereby making samples each of which was equipped with a cured film on one of the opposite surfaces of the resin plate.

For the ultraviolet irradiation operation, an electrodeless lamp (or H bulb) produced by FUSION UV SYSTEMS JAPAN Co., Ltd. was employed. The lamp height was set at the focal length (e.g., 10 cm) of the light-collecting mirror, and the cured films were irradiated with ultraviolet light for 10 passes at a conveyor speed of 10 m/min. The irradiation energy per one pass was 500 mJ/cm$^2$ (i.e., 5,000 mJ/cm$^2$ in total) in the region of UV-A according UV POWER PUCK produced by EIT Corp. Moreover, the peak illumination intensity was 1,600 mW/cm$^2$ in the UV-A region.

For the obtained cured films, the transparency, (initial) adhesiveness, wear resistance, weatherability (e.g., weathered adhesiveness and presence or absence of cracks), and scratch resistance were evaluated by methods being described below. Those evaluation results are given in Table 2, Table 4 and Table 5.

(I) Initial Adhesiveness

Eleven slits were cut into the cured films, which were in the initial state immediately after the sample making, at intervals of 2 mm onto each of the longitudinal and lateral sides using a cutter knife, thereby forming a 10×10 grid-shaped square elements, respectively. Thereafter, pursuant to JIS K5400, a cellophane tape produced by NICHIBAN Co., Ltd. was stuck onto the grid-shaped square elements, and then the cellophane tape was peeled off, respectively. The adhesiveness was evaluated by a proportion of residual films after peeling off the cellophane tape (that is, a number of remained grid-shaped square elements (units: %)).

(II) Transparency

Pursuant to JIS K7136, the haze H (%) of the cured films was measured for every substrate using "NDH-2000," a turbidimeter produced by NIHON DENSHOKU KOGYO. The smaller the H value was, the more satisfactorily the transparency was evaluated.

(III) Wear Resistance

A Taber-type wear test was carried out in compliance with ASTM D-1044. The wear resistance was evaluated by measuring the haze difference ΔH (%) between the values before and after the Taber-type wear test in which a Taber-type wear tester was employed. Note herein that the wear wheel was CS-10F, each of the loads was set at 500 g, and the number of rotations was set at 500 times. The smaller the ΔH (%) was, the more satisfactorily the wear resistance was evaluated.

(IV) Weatherability

Pursuant to JIS K5400, an accelerated test was carried out for 5,000 hours using a carbon arc-type sunshine weatherometer, thereby evaluating the adhesiveness (or weathered adhesiveness) and the presence or absence of cracks for every 500 hours. Note that the adhesiveness was judged to be satisfactory in the samples from which the cured film was not peeled off when a cellophane tape was stuck onto and then peeled off from the post-accelerated-test cured film. Moreover, regarding the cracks, those in which no cracks were discovered by visual observation were judged to be satisfactory. The results are shown in Table 2 and Table 4. In the respective tables, there are set forth the numbers of the longest time of the testing times in the accelerated test being carried out for cured films that were ascertained to be satisfactory with regard to the adhesiveness and cracks. Those with a greater number of hours were evaluated to be more satisfactory in terms of the weatherability. Regarding those which received a satisfactory evaluation after the accelerated test for 5,000 hours, they are noted by a symbol, "5000<," respectively.

(V) Scratch Resistance

For Samples #01, #02, #C1 and #C0, the scratch resistance was evaluated. Luster values (e.g., at 20°) were measured for the respective cured films to find the difference before and after a scratch test, thereby evaluating the scratch resistance by a luster retention rate.

The scratch test was carried out by scratching the cured film with a load of 500 g for 150 times back and forth reciprocally using a water-moistened Nylon scrubbing brush with abrasive (e.g., "SCOTCH BRIGHT No. 96" produced by SUMITOMO 3M Co., Ltd.). The cured films before and after the scratch test were subjected to a measurement for the luster retention rate using a "GAKUSHIN"-type rubbing tester, a product of DAIEI KAGAKU SEIKI Co., Ltd., for the fastness of dyed article. Results of the measurement are shown in Table 5. The results show that the higher retention rate they have the more satisfactory the scratch resistance was.

On Component (A)

Samples #21 through #23, which were made using Compositions #C1 through #C3 (i.e., Comparative Example Nos. 1 through 3), were samples for evaluating the properties of Component (A). In the initial state, any of the samples showed high transparency and adhesiveness. Sample #21, which was made using Composition #C1 including Component (A), was superior to #22, which was made using Composition #C2 including Composition (A)', in terms of the weatherability, but was inferior to it in terms of the wear resistance. Moreover, the weatherability of Sample #23, which was made using Composition #C3 including both of Component (A) and Component (A)', was lower than that of Sample #21, and the wear resistance was lower than that of Sample #22. That is, it was understood that, even when both of Component (A), which is excellent in the weatherability, and Component (A)', which is excellent in the wear resistance, are used, the characteristics, which each of the components has inherently, are not demonstrated satisfactorily.

On the other hand, as shown in Table 2, Samples #01 through #11, which were made using Compositions #E1 through #E11 according to Example No. 1 through Example No. 11 in which Component (A) and Component (B) were used combinedly, exhibited the wear resistance and weatherabilty that were made compatible with each other at higher level, and their adhesiveness to the resin plate and transparency were also satisfactory.

When comparing Sample #04 with Sample #05, Composition #E4 (i.e., Example No. 4) including "IPDI-M313" was much better in terms of the weathered adhesiveness between the cured film and the resin plate than was Composition #E5 (i.e., Example No. 5) including "HDI-M313." This is presumed to result from the difference between the structures of the two, namely, those of "HDI-M313" and "IPDI-M313."

Note that it was understood from the evaluation results of Sample #06 and Sample #05 that reducing the blending amount of Component (B) in Composition #E5 from 5 parts to 2.4 parts, like Composition #E6 (i.e., Example No. 6), leads to upgrading the weatherabilty, although the wear resistance declines slightly.

On Component (B)

In the respective examples, Component (B) was employed in an amount of from 2.4 to 12.5 parts with respect to a sum of Component (A) and Component (B) being taken as 100 parts. The obtained cured films were excellent in terms of the wear resistance and weatherability. However, in Sample #26 which was made using Composition #C6 according to Comparative Example No. 6, the resulting weatherability was low considerably. Composition #C6 was a comparative example in which the blending proportion of Component (B) was made greater. That is, it was understood that the weatherability, which Component (A) has inherently, is impaired when the blending proportion of Component (B) is too much. In other words, even when the blending proportion of Component (B) was less, it was possible to impart wear resistance, while maintaining the weatherability that Component (A) had inherently, by using Component (A) and Component (B) combindely.

Moreover, it was understood from Table 2 that employing Component (B) in such an amount of from 2 to 13 parts approximately leads to making it possible to upgrade the wear resistance and weatherability (that correspond to the evaluation results of #21) of Component (A).

On the other hand, Samples #24 and #25 were made using Compositions #C4 and #C5 (i.e., Comparative Example Nos. 4 and 5) that included Component (B)' instead of Component (B). Composition #C4 is an example in which a colloidal silica that was not modified superficially, namely, (b2), was used as it was. In the cured film according to Sample #24, the transparency was low considerably, and the weathered adhesiveness was also low. Moreover, Composition #C5 included (b2), which was modified superficially by a methacryloyl group, as Component (B)'. In the cured film according to Sample #25, the transparency was sufficient, but the weathered adhesiveness was insufficient.

On Mass Ratio Between (b1) and (b2)

Compositions #E4 and #E8 were examples in which compositions whose mass ratios between (b1) and (b2) in Component (B) differed one another were used. Any of the samples were excellent in terms of the wear resistance because ΔH<6(%). Sample #04, which was made using Composition #E4 whose mass ratio between (b1) and (b2) in Composition (B) was 44:56, was excellent in terms of the weatherability compared with that of Sample #08, which was made using Composition #E8 whose mass ratio between (b1) and (b2) in Composition (B) was 23:77.

Moreover, Composition #E10 was a composition including Composition (B) in which the mass ratio between (b1) and (b2) was 67:33. Although Composition #E10 included Composition (B) in a great amount (i.e., 12.5 parts) relatively, ΔH was close to 10% in Sample #10. On the other hand, in Sample #04 and Sample #08, ΔH did not go beyond 6% even when the proportion of Component (B) was 5 parts. Even when taking the influence of Component (G) into consideration, it is possible to say that Composition #E4 and Composition #E8 had a higher effect of upgrading wear resistance than did Composition #E10. That is, it was understood that it is preferable to generate Component (B) with such a mass ratio that satisfies (b1) (b2). It is possible to say that an especially preferable mass ratio between (b1) and (b2) can be from 2:8 to 5:5, and that it can be from 4:6 to 5:5 in a case where it is desired to further upgrade the resulting weatherability.

Anyway, it was understood from the evaluation results of the respective examples that it is effective as Component (B) that the mass ratio between (b1) and (b2) in Component (B) can fall in a range of from 20:80 to 75:25.

When comparing the composition according to Example No. 8 with the composition according to Example No. 9, Sample #09, which was made using Composition #E9 whose colloidal silica had large particle diameters (that is, whose silica fine particles' specific surface areas were small slightly), showed the same weatherability as that of Sample #04 even when the mass ratio between (b1) and (b2) was 23:77. Even when the silica particle diameters were larger, the cured film's transparency was higher.

From the above results, it is believed that a proper magnitude of the superficial modification to (b2) by means of (b1) contributes to upgrading weatherability and wear resistance.

Although Composition #E11 according to Example No. 11 was an example in which "CI-Silica" was employed as Component (B), the weatherability of the resulting cured film was low slightly, compared with that of the compositions according to the other examples which included "THPI-Silica" as Component (B). Therefore, in the case of putting greater importance onto weatherability, it is especially preferable to include "THPI-Silica" in Component (B).

On Component (D)

Sample #27 was made using Composition #C7 that did not include any Component (D), but in which Component (A) and Component (B) were nevertheless used combinedly. Although Sample #27 was excellent in terms of the wear resistance, the weatherability was low. That is, it was understood that including an ultraviolet absorber as Component (D) leads to making it possible to maximally demonstrate the advantage of using Component (A) and Component (B) combinedly.

Sample #01 was made employing Composition #E1 (i.e., Example No. 1) that included only "RUVA-93," one of benzotriazole-based ultraviolet absorbers having a methacryloyl group, as Component (D). This Sample #01 was excellent in terms of the wear resistance and weatherability. Sample #02 and Sample #03 were made using Composition #E2 (i.e., Example No. 2) or #E3 (i.e., Example No. 3) that further included "T-479," one of triazine-based ultraviolet absorbers, as Component (D). In any of them, although the wear resistance declined slightly compared with that of #01, they turned into one of those whose weatherability was excellent especially.

Moreover, when comparing Sample #04 with Sample #07, the weatherability was satisfactory in any of them. However, one in which Composition #E4 (i.e., Example No. 4) including "RUVA-93" as Component (D) was used was much better in terms of the wear resistance than was the other.

From above, it is preferable to use Component (D) that includes a benzotriazole-based ultraviolet absorber having a methacryloyl group, from the standpoint of the wear resistance of the resulting cured films.

On Component (G)

When comparing Sample #03 with #04, it was understood that using Composition #E4 (i.e., Example No. 4), which included a fluorine-based surface modifier (e.g., "DAC") as Component (G), leads to upgrading wear resistance.

On Scratch Resistance

It was understood from Table 5 that the scratch resistance was high in the cured films that were made using Compositions #01 (i.e., Example No. 1) and #02 (i.e., Example No. 2) that included both of Component (A) and Component (B) simultaneously.

On the other hand, in the composition according to Comparative Example No. 1 that did not include any Component (B), the resulting cured film's scratch resistance was low considerably. It was understood from the evaluation results of Sample #00 (see Table 4) that, in Composition #C0 according to Reference Example No. 1 that included as Component (B)' an alkoxysilane condensate that included a (meth)acryloyl group as the functional group, the resultant cured film's scratch resistance was insufficient, although the wear resistance and weatherability were made compatible with each other and the adhesiveness to the resin plate as well as the transparency were satisfactory.

INDUSTRIAL APPLICABILITY

It is possible to employ the curing-type coating-agent composition according to the present invention suitably as coating agents for various substrates being employed outside, in particular, for substrates being made of resins.

To be concrete, the following can be given: architectural materials for outside applications, such as exterior walls and roofs of buildings; cases for outdoor devices and meters being always installed outside; road-related members, such as plastic component parts being used for traffic lights, outside lightings, traffic signs and guard rails; show windows; lenses, such as telescopes and eyeglasses; playground equipment or toys being present in parks or amusement grounds; and articles for food, or articles for medical service, which are irradiated with light for the purpose of sterilization or the like.

TABLE 1

| | | Composition No. | | | | | | | | | | |
|---|---|---|---|---|---|---|---|---|---|---|---|---|
| | | #E1 | #E2 | #E3 | #E4 | #E5 | #E6 | #E7 | #E8 | #E9 | #E10 | #E11 |
| (A) | IPDI-M313 | 95 | 95 | 95 | 95 | — | — | 95 | 95 | 95 | 87.5 | 87.5 |
| | HDI-M313 | — | — | — | — | 95 | 97.6 | — | — | — | — | — |
| (B) | THPI-Silica-1 | 5 | 5 | 5 | 5 | 5 | 2.4 | 5 | — | — | — | — |
| | THPI-Silica-2 | — | — | — | — | — | — | — | 5 | — | — | — |
| | THPI-Silica-3 | — | — | — | — | — | — | — | — | 5 | — | — |
| | THPI-Silica-4 | — | — | — | — | — | — | — | — | — | 12.5 | — |
| | CI-Silica | — | — | — | — | — | — | — | — | — | — | 12.5 |
| (C) | Irg-819 | 2 | 2 | 2 | 2 | 2 | 2 | 2 | 2 | 2 | 2 | 2 |
| (D) | RUVA-93 | 5 | 5 | 5 | 5 | 5 | 5 | — | 5 | 5 | 5 | 5 |
| | T-479 | — | 2.5 | 5 | 5 | 5 | 5 | 10 | 5 | 5 | 5 | 5 |
| (E) | PGM | 110 | 110 | 110 | 110 | 110 | 110 | 110 | 110 | 110 | 110 | 110 |
| | Solvent in DAC | — | — | — | 2.4 | 2.4 | 2.4 | 2.4 | 2.4 | 2.4 | — | — |
| (F) | T-123 | 1 | 1 | 1 | 1 | 1 | 1 | 1 | 1 | 1 | 1 | 1 |
| (G) | DAC (NV) | — | — | — | 0.6 | 0.6 | 0.6 | 0.6 | 0.6 | 0.6 | — | — |
| | 8019ADD | 0.1 | 0.1 | 0.1 | — | — | — | — | — | — | — | — |

TABLE 2

| | | Sample No. | | | | | | | | | | |
|---|---|---|---|---|---|---|---|---|---|---|---|---|
| | | #01 | #02 | #03 | #04 | #05 | #06 | #07 | #08 | #09 | #10 | #11 |
| Composition No. | | #E1 | #E2 | #E3 | #E4 | #E5 | #E6 | #E7 | #E8 | #E9 | #E10 | #E11 |
| Initial State | Transparency, H (%) | 0.3 | 0.3 | 0.3 | 0.3 | 0.3 | 0.3 | 0.3 | 0.3 | 0.3 | 0.3 | 0.3 |
| | Adhesiveness, Residual Film (%) | 100 | 100 | 100 | 100 | 100 | 100 | 100 | 100 | 100 | 100 | 100 |
| Wear Resistance, ΔH (%) | | 5.6 | 7.5 | 7.9 | 5.9 | 5.7 | 7.9 | 9.9 | 5.5 | 6.3 | 9.8 | 6.3 |
| Weatherability | Adhesiveness (hour) | 5000 | 5000< | 5000< | 5000< | 5000 | 5000< | 5000< | 5000 | 5000< | 5000 | 4500 |
| | Cracks (hour) | 5000< | 5000< | 5000< | 5000< | 5000< | 5000< | 5000< | 5000< | 5000< | 5000< | 5000< |

TABLE 3

|   | | #C1 | #C2 | #C3 | #C4 | #C5 | #C6 | #C7 | #C0 |
|---|---|---|---|---|---|---|---|---|---|
| (A) | IPDI-M313 | 100 | — | 50 | 95 | 95 | 60 | 95 | 87.5 |
| (A)' | IPDI-M305 | — | 100 | 50 | — | — | — | — | — |
| (B) | THPI-Silica-1 | — | — | — | — | — | — | 5 | — |
|  | CI-Silica | — | — | — | — | — | 40 | — | — |
| (B)' | IPA-ST (NV) | — | — | — | 5 | — | — | — | — |
|  | Methacryl-Silica | — | — | — | — | 5 | — | — | — |
|  | MAQ-TQ | — | — | — | — | — | — | — | 12.5 |
| (C) | Irg-819 | 2 | 2 | 2 | 2 | 2 | 2 | 2 | 2 |
| (D) | RUVA-93 | 5 | 5 | 5 | 5 | 5 | 5 | — | 5 |
|  | T-479 | 5 | 5 | 5 | 5 | — | — | — | 2.5 |
| (E) | PGM | 110 | 110 | 110 | 100 | 110 | 110 | 110 | 110 |
|  | Solvent in DAC | — | — | — | 2.4 | — | — | — | — |
|  | Solvent in IPA-ST | — | — | — | 11.7 | — | — | — | — |
| (F) | T-123 | 1 | 1 | 1 | 1 | 1 | 1 | 1 | 1 |
| (G) | DAC (NV) | — | — | — | 0.6 | — | — | — | — |
|  | 8019ADD | — | — | — | — | — | — | 0.1 | 0.1 |

TABLE 4

| | | Sample No. | | | | | | | |
|---|---|---|---|---|---|---|---|---|---|
| | | #21 | #22 | #23 | #24 | #25 | #26 | #27 | #00 |
| Composition No. | | #C1 | #C2 | #C3 | #C4 | #C5 | #C6 | #C7 | #C0 |
| Initial State | Transparency, H (%) | 0.3 | 0.3 | 0.3 | 4.8 | 0.3 | 0.3 | 0.3 | 0.3 |
| | Adhesiveness, Residual Film (%) | 100 | 100 | 100 | 100 | 100 | 100 | 100 | 100 |
| Wear Resistance, ΔH (%) | | 23.0 | 7.8 | 14.4 | 7.1 | 6.7 | 5.5 | 5.0 | 8.0 |
| Weatherability | Adhesiveness (hour) | 4000 | 2000 | 3000 | 3500 | 3500 | 2000 | 1000 | 5000< |
| | Cracks (hour) | 5000 | 2500 | 3500 | 5000< | 5000< | 3000 | 3000 | 5000< |

TABLE 5

| Sample No. | Composition No. | Luster Retention Rate (%) |
|---|---|---|
| #01 | #E1 (i.e., Ex. No. 1) | 81 |
| #02 | #E2 (i.e., Ex. No. 2) | 75 |
| #21 | #C1 (i.e., Comp. Ex. No. 1) | 5 |
| #00 | #C0 (i.e., Ref. Ex. No. 1) | 20 |

The invention claimed is:

1. A curing-type coating-agent composition, comprising:
Component (A) in an amount of from 99 to 65 parts by mass;
Component (B) in an amount of from 1 to 35 parts by mass;
a radical-polymerization initiator serving as Component (C) in an amount of from 0.1 to 10 parts by mass;
an ultraviolet absorber serving as Component (D) in an amount of from 1 to 12 parts by mass; and
an organic solvent serving as Component (E) in an amount of from 10 to 1,000 parts by mass;
with respect to a sum of said Component (A) and said Component (B) being taken as 100 parts by mass;
Component (A): a mixture of isocyanuric ring-containing (meth)acrylates, the mixture being constituted of a urethane adduct compound (a1) and a tri(meth)acrylate compound (a2);
the urethane adduct compound (a1) being obtainable by an addition reaction of a hydroxide group-containing di(meth)acrylate compound, which is expressed by Formula (1), and an isocyanate compound, which has two or more isocyanate groups within the molecule;
the tri(meth)acrylate compound (a2) being expressed by Formula (2);

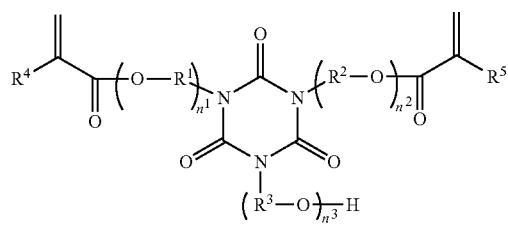

(1)

wherein in Formula (1), each of $R^1$, $R^2$ and $R^3$ expresses a divalent organic group whose number of carbon atoms is from 2 to 10 independently; each of $R^4$ and $R^5$ expresses a hydrogen atom or a methyl group independently; each of $n^1$, $n^2$ and $n^3$ expresses a number of from 1 to 3 independently; and $n^1 + n^2 + n^3$ = from 3 to 9;

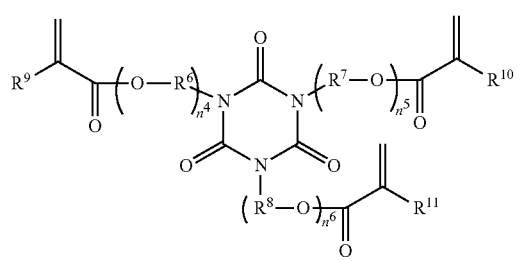

(2)

wherein in Formula (2), each of $R^6$, $R^7$ and $R^8$ expresses a divalent organic group whose number of carbon atoms is from 2 to 10 independently; each of $R^9$, $R^{10}$; and $R^{11}$ expresses a hydrogen atom or a methyl group independently; each of $n^4$, $n^5$; and $n^6$ expresses a number of from 1 to 3 independently; and $n^4+n^5+n^6=$ from 3 to 9;

Component (B): an involatile component in reaction products being made by reacting an alkoxysilane compound (b1), which is expressed by Formula (3), with a colloidal silica (b2), in a mass ratio of from 9:1 to 1:9 between (b1) and (b2), the involatile component involving those in which (b2) is modified chemically with (b1);

(3)

wherein in Formula (3), "P" expresses a group being expressed by Formula (4); $R^{12}$ expresses a hydrogen atom or a monovalent organic group; and "z" expresses a positive number of from 0.1 or more to 3 or less; moreover, when "z" is less than 3, (b1) involves a condensate, and each of "P" and $R^{12}$ may even involve two or more types of distinct groups within a molecule in the condensate;

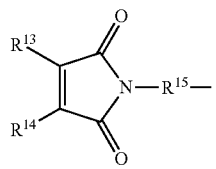

(4)

wherein in Formula (4), each of $R^{13}$; and $R^{14}$ expresses a hydrogen atom, an alkyl group, an alkenyl group or an aryl group independently, or alternatively expresses a hydrocarbon group in which $R^{13}$ and $R^{14}$ are unified to form a five-membered ring or a six-membered ring; and $R^{15}$ expresses a divalent saturated hydrocarbon group whose number of carbon atoms is from 1 to 6.

2. The curing-type coating-agent composition as set forth in claim 1, wherein a maleimide group in Formula (4) is expressed by following Formula (5)

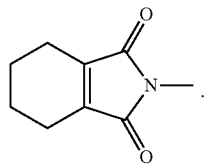

(5)

3. The curing-type coating-agent composition as set forth in claim 1, wherein said Component (D) includes a benzotriazole-based ultraviolent absorber having a (meth)acryloyl group.

4. The curing-type coating-agent composition as set forth in claim 1, wherein the mass ratio between said (b1) and said (b2) is from 2:8 to 8:2.

5. The curing-type coating-agent composition as set forth in claim 1, wherein said (b2) has an average primary particle diameter of from 5 to 60 nm.

6. The curing-type coating-agent composition as set forth in claim 1, wherein:
$R^1$, $R^2$ and $R^3$ are an alkylene group whose number of carbon atoms is from 2 to 4, respectively; $n^1$, $n^2$ and $n^3$ are 1, respectively; and $n^1+n^2+n^3=3$ in Formula (1) for Component (A); and
$R^6$, $R^7$ and $R^8$ are an alkylene group whose number of carbon atoms is from 2 to 4, respectively; $n^4$, $n^5$ and $n^6$ are 1, respectively; and $n^4+n^5+n^6=3$ in Formula (2) for Component (A).

7. The curing-type coating-agent composition as set forth in claim 1, wherein a mass ratio between said compound (a1) and said compound (a2) is from 1:9 to 7:3 in said Component (A).

8. The curing-type coating-agent composition as set forth in claim 1, further comprising a hindered amine-based light stabilizer serving as Component (F) in an amount of from 0.05 to 1.5 parts by mass with respect to a sum of said Component (A) and said Component (B) being taken as 100 parts by mass.

9. The curing-type coating-agent composition as set forth in claim 1, further comprising a silicone-based and/or fluorine-based surface modifier serving as Component (G) in an amount of from 0.01 to 1.0 part by mass with respect to a sum of said Component (A) and said Component (B) being taken as 100 parts by mass.

10. The curing-type coating-agent composition as set forth in claim 1, wherein said Component (C) is a photo radical-polymerization initiator.

11. The curing-type coating-agent composition as set forth in claim 1, wherein said Component (B) is an involatile component in reaction products being obtainable by means of a production process that includes:
a step of adding an aminoalkyltrialkoxysilane to a carboxylic acid anhydride having a double bond that is expressed by following Formula (6), thereby turning them into an amic acid;
a step of turning said amic acid into a maleimide group by means of subjecting said amic acid to ring closing by heating, and subjecting an alkoxyl group to a hydrolytic condensation reaction with use of water that generates in the ring-closing reaction, thereby obtaining an alkoxysilane compound (b1) being expressed by Formula (3); and
a step of reacting the obtained (b1) with the colloidal silica (b2) by heating them in the presence of an organic solvent including water;

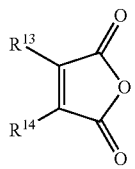

(6)

wherein in Formula (6), $R^{13}$; and $R^{14}$ are synonymous with those above-mentioned.

* * * * *